United States Patent
Yamauchi et al.

(10) Patent No.: US 11,020,757 B2
(45) Date of Patent: Jun. 1, 2021

(54) ROTARY ATOMIZING HEAD, ROTARY ATOMIZING HEAD MANAGING SYSTEM, AND ROTARY ATOMIZING HEAD MANAGING METHOD

(71) Applicants: HITACHI SYSTEMS, LTD., Tokyo (JP); ABB K.K., Tokyo (JP)

(72) Inventors: Shigeru Yamauchi, Tokyo (JP); Masaaki Saruyama, Tokyo (JP); Masaaki Kitagawa, Tokyo (JP); Shinya Nomura, Tokyo (JP)

(73) Assignees: HITACHI SYSTEMS, LTD., Tokyo (JP); ABB SCHWEIZ AG, Baden (CH)

( * ) Notice: Subject to any disclaimer, the term of this patent is extended or adjusted under 35 U.S.C. 154(b) by 137 days.

(21) Appl. No.: 16/321,326

(22) PCT Filed: Apr. 17, 2017

(86) PCT No.: PCT/JP2017/015479
§ 371 (c)(1),
(2) Date: Jan. 28, 2019

(87) PCT Pub. No.: WO2018/020755
PCT Pub. Date: Feb. 1, 2018

(65) Prior Publication Data
US 2019/0160479 A1 May 30, 2019

(30) Foreign Application Priority Data
Jul. 28, 2016 (JP) .............................. JP2016-149000

(51) Int. Cl.
*B05B 5/04* (2006.01)
*B05B 12/00* (2018.01)
(Continued)

(52) U.S. Cl.
CPC .............. *B05B 5/0407* (2013.01); *B05B 3/10* (2013.01); *B05B 3/1007* (2013.01); *B05B 5/04* (2013.01);
(Continued)

(58) Field of Classification Search
CPC ....... B05B 3/10; B05B 3/1007; B05B 3/1014; B05B 3/1035; B05B 5/04; B05B 5/0403;
(Continued)

(56) References Cited

U.S. PATENT DOCUMENTS

2003/0156401 A1* 8/2003 Komine ............. B23Q 3/15546
361/815
2007/0161159 A1 7/2007 Yamazaki et al.
(Continued)

FOREIGN PATENT DOCUMENTS

CN 101090773 A 12/2007
CN 101896313 A 1/2011
(Continued)

OTHER PUBLICATIONS

EPO Extended Search Report for corresponding EP Patent Application No. 17833766.3 dated Feb. 24, 2020.
(Continued)

*Primary Examiner* — Darren W Gorman
(74) *Attorney, Agent, or Firm* — Cantor Colburn LLP

(57) ABSTRACT

This rotary atomizing head used in a rotary atomizing head type painting device is provided with: an atomizing head main body formed in a bell shape or a cup shape; an attachment part which is connected to the atomizing head main body and attaches the atomizing head main body to a motor rotary shaft of the rotary atomizing head type painting device; and a resin mold in which an IC tag containing unique information about the rotary atomizing head stored therein is embedded, and which is attached to the attachment
(Continued)

part, wherein the attachment part can have a prescribed structure, the resin mold is attached to the attachment part through a prescribed method, and the IC tag is embedded in the resin mold such that the surface of an embedded coil antenna adopts a prescribed state.

6 Claims, 23 Drawing Sheets

(51) Int. Cl.
  *B05B 3/10* (2006.01)
  *G06Q 10/00* (2012.01)
  *G06K 19/077* (2006.01)
  *B05B 12/14* (2006.01)

(52) U.S. Cl.
  CPC ............ *B05B 12/00* (2013.01); *G06K 19/077* (2013.01); *G06Q 10/00* (2013.01); *B05B 12/004* (2013.01); *B05B 12/1436* (2013.01); *G06K 19/07758* (2013.01)

(58) Field of Classification Search
  CPC ..... B05B 5/0407; B05B 12/00; B05B 12/004; B05B 12/1436; G06K 19/077; G06K 19/07745; G06K 19/07747; G06K 19/07749; G06K 19/07758; G06Q 10/00
  See application file for complete search history.

(56) References Cited

U.S. PATENT DOCUMENTS

| | | | | |
|---|---|---|---|---|
| 2009/0175694 A1* | 7/2009 | Craig | ............... | G05B 19/124 407/37 |
| 2012/0326931 A1* | 12/2012 | Murayama | ............... | H01Q 7/00 343/702 |
| 2013/0167703 A1 | 7/2013 | Chang et al. | | |
| 2014/0113527 A1* | 4/2014 | Lindsay | ............... | B23K 5/00 451/5 |
| 2016/0217364 A1 | 7/2016 | Ronneberger et al. | | |
| 2017/0026089 A1* | 1/2017 | Kato | ............... | G06K 19/07779 |
| 2017/0259290 A1* | 9/2017 | Kraft | ............... | G01N 21/88 |

FOREIGN PATENT DOCUMENTS

| | | |
|---|---|---|
| CN | 101959608 A | 1/2011 |
| CN | 103186808 A | 7/2013 |
| EP | 1153666 A2 | 11/2001 |
| EP | 1369811 A1 | 12/2003 |
| EP | 2839885 A1 | 2/2015 |
| FR | 3025125 A1 | 3/2016 |
| JP | H05154428 A | 6/1993 |
| JP | H06210214 A | 8/1994 |
| JP | 11000592 A | 1/1999 |
| JP | 2005252242 A | 9/2005 |
| JP | 2008090813 A | 4/2008 |
| JP | 2008130871 A | 6/2008 |
| JP | 2010215305 A | 9/2010 |
| JP | 2014136191 A | 7/2014 |
| JP | 2014238743 A | 12/2014 |
| JP | 2015061722 A | 4/2015 |
| JP | 2015194966 A | 11/2015 |
| JP | 2016035693 A | 3/2016 |
| WO | WO-2005075088 A2 * | 8/2005 ............ B05B 12/00 |
| WO | 2009076496 A2 | 6/2009 |
| WO | 2015036519 A1 | 3/2015 |
| WO | WO-2016087028 A1 * | 6/2016 ............ B05B 12/08 |

OTHER PUBLICATIONS

International Search Report corresponding to Application No. PCT/JP2017/015479; dated Jun. 20, 2017.
JPO Decision to Grant a Patent corresponding to Application No. 2018-529360; dated Aug. 20, 2019.
CNIPA First Office Action for corresponding CN Application No. 201780046894.X, dated Jul. 3, 2020.
EPO Office Action for corresponding EP Application No. 17833766.3, dated Nov. 4, 2020.

* cited by examiner

ROTARY ATOMIZING HEAD, ROTARY ATOMIZING HEAD MANAGING SYSTEM, AND ROTARY ATOMIZING HEAD MANAGING METHOD

CROSS REFERENCE TO RELATED APPLICATION

This is a U.S. national stage of application No. PCT/JP2017/015479, filed on Apr. 17, 2017. Priority under 35 U.S.C. § 119(a) and 35 U.S.C. § 365(b) is claimed from Japanese Patent Applications No. 2016-149000 filed on Jul. 28, 2016, the disclosure of which is also incorporated herein by reference.

TECHNICAL FIELD

The present invention relates to a rotary atomizing head, a rotary atomizing head managing system, and a rotary atomizing head managing method.

BACKGROUND ART

Atomization coating is widely used for uniformly painting a target having a complicated shape, such as, for example, an automobile main body. As the atomization coating, there has been known, besides an air atomization painting device which employs air atomization, a rotary atomizing head type painting device which employs rotary atomization which causes the high-speed rotation of a disk or a cup supplied with a paint to form a thin film on a surface of the rotating body, atomizes the paint at a peripheral edge of the rotating body to turn the fluid into particulates.

During a painting work using the rotary atomizing head type painting device, the atomized paint sometimes partly floats in the surroundings to stick to part of the device. For example, Patent Literature 1 describes a rotary atomizing head type painting device in which a paint sticking to its cover can be removed by a simple work.

Further, IC tags are used a lot as recognition media in transportation, distribution, and so on or for various purposes such as quality control and inventory control of products because they are capable of recording and holding information and exchanging information by non-contact communication with an external device. Such an IC tag is composed of an IC chip in which information is recorded and a radio antenna, and is pasted on or embedded in a target for use. In a case where the information recorded in the IC chip is read, a reader/writer device communicates with the IC tag only by being held over the IC tag, and is capable of the non-contact reading of the information recorded in the IC chip.

Further, in recent years, with IC tags attached to various kinds of members, the management of individual items such as maintenance information of the members and the ensuring of their traceability are coming to be done. For example, Patent Literature 2 describes a structure of an IC tag that is presumed to be attached to a metal surface.

CITATION LIST

Patent Literature

{PTL 1} JP 2014-136191 A
{PTL 2} JP 2008-90813 A

SUMMARY OF INVENTION

Technical Problem

In a rotary atomizing head type painting device, in order to manage a part such as a rotary atomizing head (also called a bell cup), it has conventionally been done that part individual information is inscribed by means of characters (or pasted as a seal or the like) on the rotary atomizing head and is visually checked, or an optical code such as a barcode or a QR code (registered trademark) in which part information is recorded is pasted on the rotary atomizing head and is read by a reader.

However, there has been a problem that, on a small part, the character information is difficult to read or the optical code cannot be pasted. There has been another problem that these pieces of information are difficult to read if a paint sticks to the rotary atomizing head during a painting work as described above.

Further, since the rotary atomizing head is a metal part that is rotated at a high speed, it has been difficult to attach the IC tag thereon so as to enable good communication and so as to prevent the IC tag from coming off due to the high-speed rotation.

Therefore, it is an object of the present invention to provide a rotary atomizing head, a rotary atomizing head managing system, and a rotary atomizing head managing method capable of solving the above problems, that is, enabling the easy management of the rotary atomizing head.

Solution to Problem

In order to solve the aforesaid problems, in a first aspect of a rotary atomizing head of the present invention, it includes: an atomizing head main body formed in a bell shape or a cup shape; an attachment part which is connected to the atomizing head main body and attaches the atomizing head main body to a motor rotary shaft of a rotary atomizing head type painting device; and a resin mold in which an IC tag containing unique information about the rotary atomizing head stored therein is embedded and which is attached to the attachment part, the attachment part has a female screw structure and has a groove-shaped cutout portion formed at such an angle that the cutout portion does not pass through a cylindrical center of a female screw portion, the resin mold is fitted in the cutout portion of the attachment part, and the IC tag is embedded in the resin mold such that a surface of an embedded coil antenna is parallel to or makes a predetermined inclination angle with a cross section of the cutout portion.

In a second aspect of a rotary atomizing head of the present invention, it includes: an atomizing head main body formed in a bell shape or a cup shape; an attachment part which is connected to the atomizing head main body and attaches the atomizing head main body to a motor rotary shaft of a rotary atomizing head type painting device; and a resin mold in which an IC tag containing unique information about the rotary atomizing head stored therein is embedded and which is attached to the attachment part, the attachment part has a male screw structure and has a groove-shaped cutout portion formed at such a position that the cutout portion does not pass through a center of a male screw portion, the resin mold is fitted in the cutout portion of the attachment part, and the IC tag is embedded in the resin mold such that a surface of an embedded coil antenna is parallel to or makes a predetermined inclination angle with a cross section of the cutout portion.

In a third aspect of a rotary atomizing head of the present invention, it includes: an atomizing head main body formed in a bell shape or a cup shape; an attachment part which is connected to the atomizing head main body and attaches the atomizing head main body to a motor rotary shaft of a rotary atomizing head type painting device; and a resin mold in which an IC tag containing unique information about the rotary atomizing head stored therein is embedded and which is connected to the attachment part, the resin mold is fitted to an outer periphery of the attachment part, and the IC tag is embedded in the resin mold such that a surface of an embedded coil antenna is perpendicular to a circumferential direction along an outer periphery of the resin mold.

In another aspect of the rotary atomizing head of the present invention, it further includes a fixing means which fixes the resin mold to the attachment part by sandwiching the resin mold between the fixing means and the atomizing head main body.

In another aspect of the rotary atomizing head of the present invention, the fixing means is made of metal.

In a first aspect of a rotary atomizing head managing system of the present invention, a rotary atomizing head includes: an atomizing head main body formed in a bell shape or a cup shape; an attachment part which is connected to the atomizing head main body and attaches the atomizing head main body to a motor rotary shaft of a rotary atomizing head type painting device; and a resin mold in which an IC tag containing unique information about the rotary atomizing head stored therein is embedded and which is attached to the attachment part, and a management device includes: an IC tag communication means for executing communication with the IC tag; and a determination means for determining whether or not the rotary atomizing head is a usable component, based on the unique information about the rotary atomizing head stored in the IC tag which information is obtained by the IC tag communication means.

In another aspect of the rotary atomizing head managing system of the present invention, the management device further includes an information exchange means for exchanging information with an external information processing device via a network, and in a case where the rotary atomizing head is the usable component, the information exchange means transmits, to the external information processing device, information indicating that the rotary atomizing head is the usable component.

In another aspect of the rotary atomizing head managing system of the present invention, in the rotary atomizing head, the resin mold is fitted to an outer periphery of the attachment part, and the IC tag is embedded in the resin mold such that a surface of an embedded coil antenna is perpendicular to a circumferential direction along an outer periphery of the resin mold, the management device further includes an information exchange means for exchanging information with an external information processing device via a network, and in a case where the rotary atomizing head is the usable component, the information exchange means transmits, to the external information processing device, information about a work executed using the rotary atomizing head.

In another aspect of the rotary atomizing head managing system of the present invention, the management device further includes a control information exchange means for exchanging control information with a control means for controlling an operation of a painting robot which executes a painting work by holding a rotary atomizing head type painting device and changing a position of the rotary atomizing head type painting device, the control information exchange means transmits, to the control means for controlling the operation of the painting robot, control information instructing to change a position of the rotary atomizing head type painting device to a position where the IC tag of the rotary atomizing head is capable of communicating with the IC tag communication means, and the determination means determines whether or not the rotary atomizing head is the usable component, based on the unique information about the rotary atomizing head stored in the IC tag which information is obtained by the IC tag communication means, after the IC tag of the rotary atomizing head is at the position where the IC tag is capable of communicating with the IC tag communication means.

In one aspect of a rotary atomizing head managing method of the present invention, a rotary atomizing head includes: an atomizing head main body formed in a bell shape or a cup shape; an attachment part which is connected to the atomizing head main body and attaches the atomizing head main body to a motor rotary shaft of a rotary atomizing head type painting device; and a resin mold in which an IC tag containing unique information about the rotary atomizing head stored therein is embedded and which is connected to the attachment part, and a management device includes: an IC tag communication means for executing communication with the IC tag; and a determination means for determining whether or not the rotary atomizing head is a usable component, based on the unique information about the rotary atomizing head stored in the IC tag which information is obtained by the IC tag communication means, the method including: an IC tag communication step in which the IC tag communication means executes the communication with the IC tag; and a determination step in which the determination means determines whether or not the rotary atomizing head is the usable component, based on the unique information about the rotary atomizing head stored in the IC tag which information is obtained by the process in the IC tag communication step.

In a second aspect of a rotary atomizing head managing system of the present invention, a rotary atomizing head includes: an atomizing head main body formed in a bell shape or a cup shape; an attachment part which is connected to the atomizing head main body and attaches the atomizing head main body to a motor rotary shaft of a rotary atomizing head type painting device; and a resin mold in which an IC tag containing unique information about the rotary atomizing head stored therein is embedded and which is attached to the attachment part, a management device includes an IC tag communication means for executing communication with the IC tag, and a relay antenna is provided between the rotary atomizing head and the management device.

In another aspect of the rotary atomizing head managing system of the present invention, the relay antenna is a dipole antenna provided with a ground wire including a low-pass filter.

In another aspect of the rotary atomizing head managing system of the present invention, the attachment part has a female screw structure and has a groove-shaped cutout portion formed at such an angle that the cutout portion does not pass through a cylindrical center of a female screw portion, the resin mold is fitted in the cutout portion of the attachment part, and the IC tag is embedded in the resin mold such that a surface of an embedded coil antenna is parallel to or makes a predetermined inclination angle with a cross section of the cutout portion.

In another aspect of the rotary atomizing head managing system of the present invention, the attachment part has a male screw structure and has a groove-shaped cutout portion formed at such a position that the cutout portion does not pass through a center of a male screw portion, the resin mold is fitted in the cutout portion of the attachment part, and the IC tag is embedded in the resin mold such that a surface of an embedded coil antenna is parallel to or makes a predetermined inclination angle with a cross section of the cutout portion.

In another aspect of the rotary atomizing head managing system of the present invention, the resin mold is fitted to an outer periphery of the attachment part, and the IC tag is embedded in the resin mold such that a surface of an embedded coil antenna is perpendicular to a circumferential direction along an outer periphery of the resin mold.

Advantageous Effects of Invention

According to the present invention, it is possible to easily manage a rotary atomizing head.

DESCRIPTION OF EMBODIMENTS

A painting device of one embodiment of the present invention will be hereinafter described with reference to FIG. 1 to FIG. 26.

Figure 1:
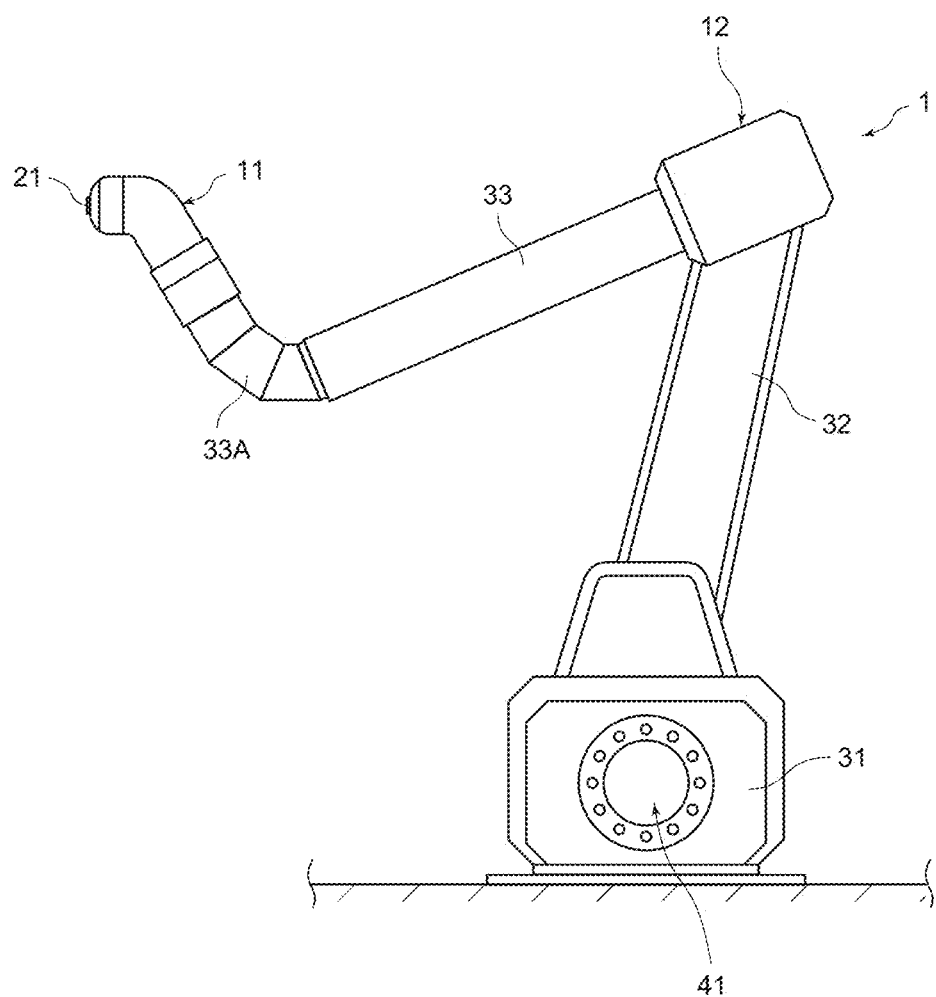
FIG. 1 is a schematic view of a painting device composed of a painting robot 1 and a rotary atomizing head type painting device 11.

FIG. 1 illustrates a schematic view of the painting device composed of a painting robot and a rotary atomizing head type painting device.

The painting robot 1 is an operation device for painting and is composed of a base 31, a vertical arm 32 rotatably and swingably provided on the base 31, and a horizontal arm 33 swingably provided at a tip of the vertical arm 32. A tip of the horizontal arm 33 is a wrist 33A capable of freely changing its direction. The rotary atomizing head type painting device 11 is attached to the wrist 33A.

Since a flammable liquid such as a thinner is mixed in a painting solution, the painting robot 1 and the rotary atomizing head type painting device 11 each have an explosion-proof structure. The base 31 has an explosion-proof purge 41 as a main constituent element of such an explosion-proof structure. A control device including a later-described IC tag reader is housed in the explosion-proof purge 41 and is configured to be capable of communicating with a later-described IC tag outside the base 31.

The rotary atomizing head type painting device 11 is changed in its position by operations of the vertical arm 32 and the horizontal arm 33 which is operated based on the control by the control device housed in the explosion-proof purge 41, and performs a painting work on a target such as, for example, an automobile frame, using an atomized paint jetted from a rotary atomizing head 21. The later-described IC tag is attached to the rotary atomizing head 21 so as to be capable of communicating with the IC tag reader. The rotary atomizing head type painting device 11 will be described in detail later.

Figure 2:
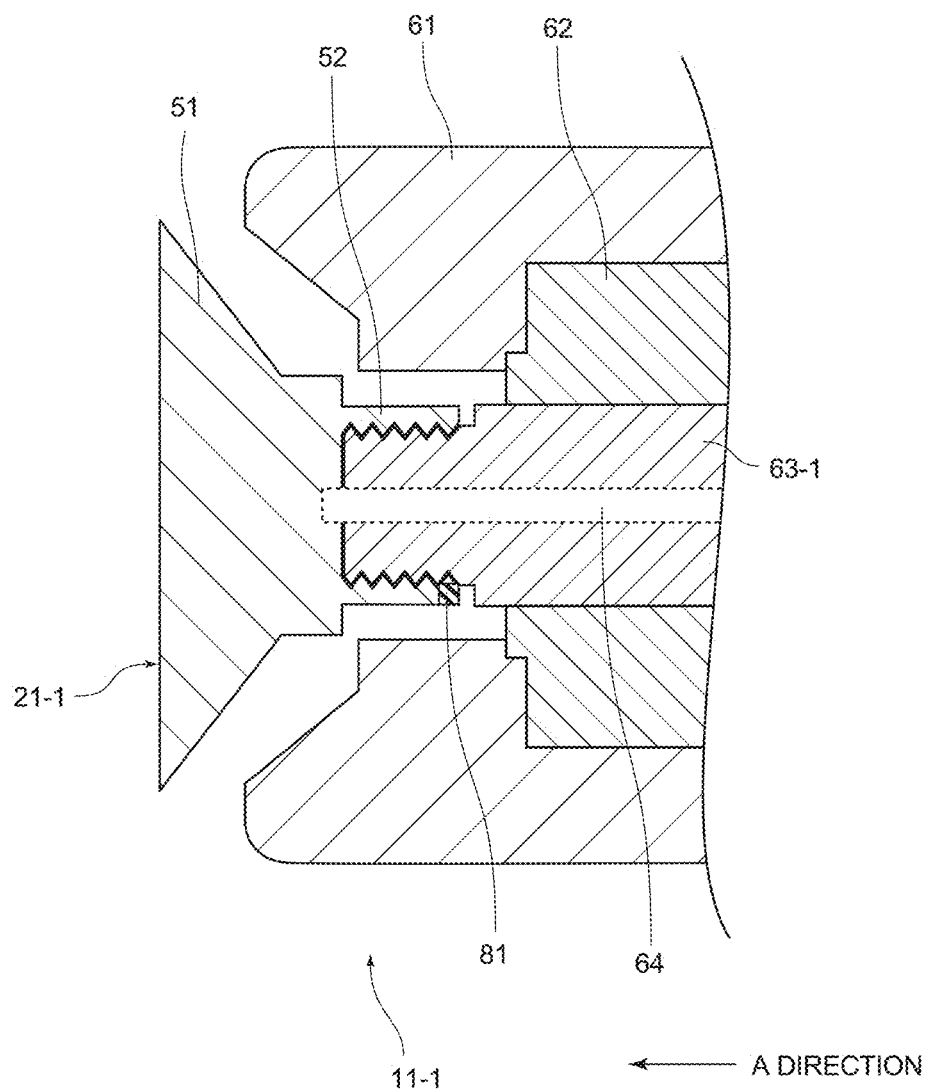
FIG. 2 is a sectional view of a tip portion of a rotary atomizing head type painting device 11-1 according to a first example.

Next, a first example of the rotary atomizing head type painting device 11 will be described. FIG. 2 illustrates a sectional view of a tip portion of a rotary atomizing head type painting device 11-1 according to the first example.

The rotary atomizing head type painting device 11-1 includes a rotary atomizing head 21-1, a shaping air nozzle 61, an air motor 62, a rotary shaft 63-1, a feed tube 64, and in addition, a high-voltage generator, a compressed air supply part, and so on which are not illustrated.

The rotary atomizing head 21-1 includes an atomizing head main body 51 and an attachment part 52. The atomizing head main body 51 and the attachment part 52 are formed of one member, but for convenience of explanation, the atomizing head main body 51 and the attachment part 52 will be described separately. The atomizing head main body 51 has a hollow shape formed in a bell shape or a cup shape, and has, in its center portion, a nozzle insertion hole to which a leading-end side of the feed tube 64 is inserted. The attachment part 52 is formed in a cylindrical shape whose inner periphery side is female-threaded for the purpose of the attachment to the rotary shaft 63-1. Further, a surface of the rotary atomizing head 21-1 is basically made of metal. The rotary atomizing head 21-1 is attached to the rotary shaft 63-1 supported by an air bearing of the air motor 62, and is rotated at a high speed, for example, 60,000 revolution per minute to turn a paint supplied from the feed tube 64 into liquid threads by a centrifugal force and sprays the paint.

Further, an IC tag 81 storing a model, a unique number, an identification code, and other unique information of the rotary atomizing head 21-1 is attached to the rotary atomizing head 21-1. In a case where the IC tag 81 is used in a state of being attached to the rotary atomizing head 21-1 which is a component basically made of metal, a magnetic path of a magnetic field induced by a high-frequency current necessary for communication needs to be reserved so as to keep clear of the metal portion, thereby achieving good communication. Further, in the attachment of the IC tag 81, it is necessary to prevent it from obstructing a flow path of a compressed air jetted from the shaping air nozzle 61 and to prevent it from coming off due to the centrifugal force even if the rotary atomizing head 21-1 rotates at a high speed. The IC tag 81 is attached to the attachment part 52 so as to satisfy these conditions. A method of attaching the IC tag 81 to the attachment part 52 will be described later.

The shaping air nozzle 61 has a shape allowing its inside or a space between itself and the rotary shaft 63-1/the rotary atomizing head 21-1 to serve as the flow path of the compressed air (also called a shaping air) supplied by the not-illustrated compressed air supply part. The shaping air nozzle 61 sprays an outer periphery of the rotary atomizing head 21-1 with the compressed air for controlling an atomization pattern or the like of paint particles sprayed from the rotary atomizing head 21-1.

The air motor 62 includes a motor casing formed in a cylindrical shape, an air turbine housed in the motor casing, and the air bearing by which the rotary shaft 63-1 is rotatably supported, and drives the high-speed rotation of the rotary shaft 63-1.

The rotary shaft 63-1 is rotatably supported by the air bearing of the air motor 62, and in internal hollow portion of the rotary shaft 63-1, the feed tube 64 is provided. A base side of the rotary shaft 63-1 is attached to the air turbine of the air motor 62. Further, an outer periphery of a tip portion of the rotary shaft 63-1 is male-threaded for the screwing of the rotary atomizing head 21-1.

The feed tube 64 is a passage of the paint or a cleaning agent and is provided to extend in an axial direction in the rotary shaft 63-1, with its tip portion being located at the rotation center of the rotary atomizing head 21-1. That is, in the painting work, the feed tube 64 is a passage for supplying the paint to the rotation center of the rotary atomizing head 21-1, and in a cleaning work, the feed tube 64 is a passage for supplying the cleaning agent such as the air or a thinner to the rotation center of the rotary atomizing head 21-1.

In the rotary atomizing head type painting device 11, a high voltage boosted in the not-illustrated high-voltage generator constituted by, for example, a Cockcroft circuit is electrically connected to the air motor 62. Consequently, the high voltage (for example, 90,000 volts) is applied to the rotary atomizing head 21-1 via the rotary shaft 63-1, making it possible to directly charge the paint supplied to the rotary atomizing head 21-1 with the high voltage.

The compressed air discharged from the shaping air nozzle 61 is directed opposite to a rotation direction of the rotary atomizing head 21-1. Accordingly, the atomization and the high-voltage charging of the paint liquid threads jetted from the rotary atomizing head 21-1 take place simultaneously, making it possible to reduce a wastefully dispersing paint and further achieve the uniform painting, even on a target having a complicated structure, such as, for example, an automobile frame.

Figure 3:
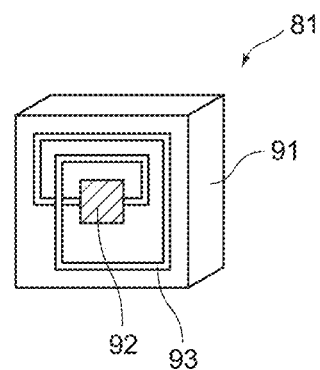
FIG. 3 is a view for explaining an IC tag 81 attached to a rotary atomizing head 21-1.

The IC tag 81 will be described with reference to FIG. 3.

As the IC tag 81, a small tag (size 2.5 mm×2.5 mm×0.4 mm) such as, for example, Hitachi Chemical IM5-PK2525 is suitably used. In the IC tag 81, an IC chip 92 in which the unique information such as the model, the unique number, and the identification code of itself are recorded and a coil antenna 93 for communication are mounted on an IC tag substrate 91.

Next, a method of attaching the IC tag 81 to the rotary atomizing head 21-1 will be described with reference to FIG. 4 to FIG. 6.

Figure 4:
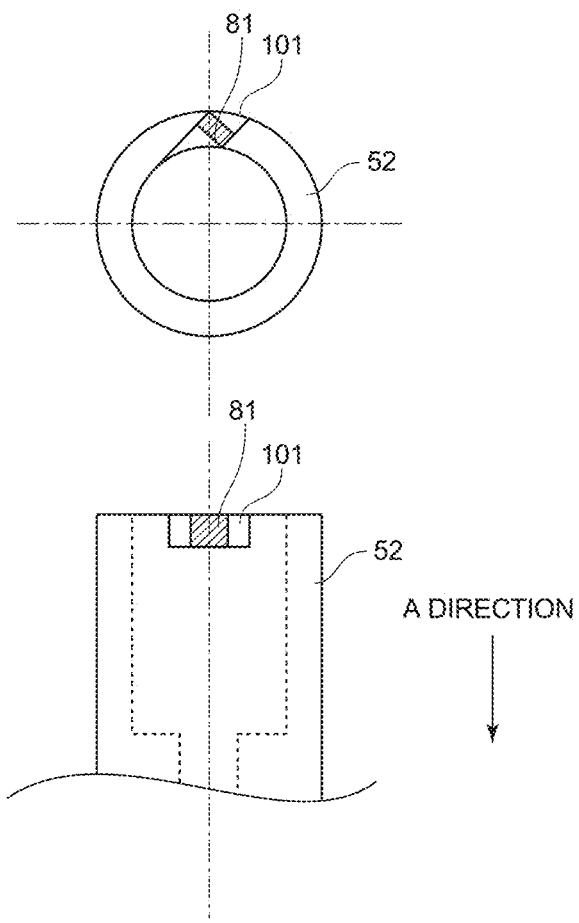
FIG. 4 is a view for explaining the attachment of a resin mold 101.
Figure 5:
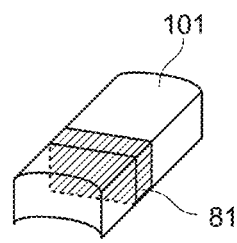
FIG. 5 is an outline view of the resin mold 101 in which the IC tag 81 is embedded.

The upper drawing in FIG. 4 is a view of the attachment part 52 of the rotary atomizing head 21-1 seen in the A direction indicated in FIG. 2, and the lower drawing in FIG. 4 is a sectional view of the attachment part 52 of the rotary atomizing head 21-1. Further, FIG. 5 is an outline view of a resin mold 101 in which the IC tag 81 is embedded.

As described above, the IC tag 81 needs to be attached so as not to come off the rotary atomizing head 21-1 which rotates at a high speed. For this purpose, as illustrated in FIG. 4, a groove-shaped cutout portion is formed in an end portion of the attachment part 52 made of metal, at such an angle that it does not pass through the cylindrical center of the attachment part 52, and in the groove portion, the resin mold 101 in which the IC tag 81 is embedded is attached. It suffices that the sectional size of the groove of the cutout portion is large enough for the IC tag 81 to be disposed therein such that the surface of the coil antenna 93 of the IC tag 81 is parallel to or makes a predetermined inclination angle with the cross section.

Figure 6:
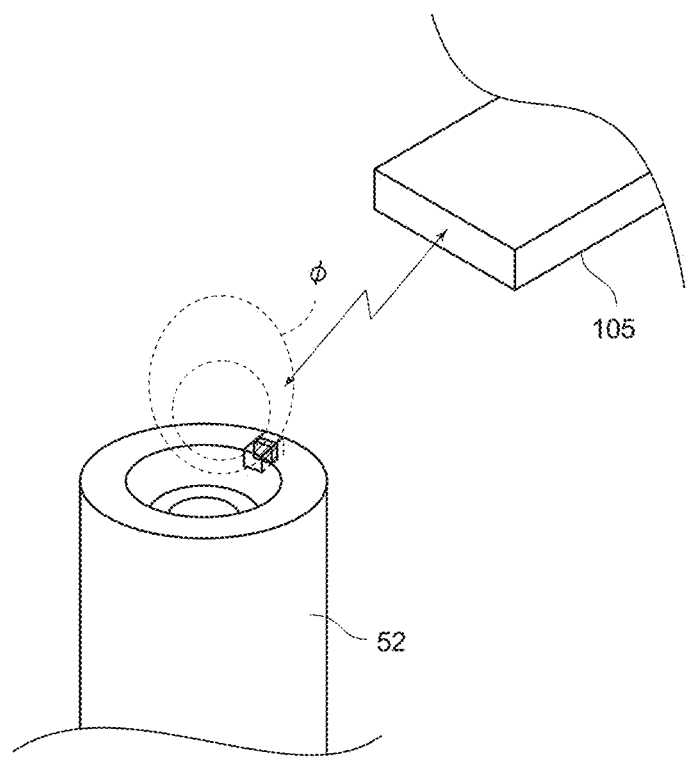
FIG. 6 is a view for explaining a magnetic field of a coil antenna 93 built in the IC tag 81.

FIG. 6 illustrates a magnetic field $\phi$ in a case where an IC tag reader 105 (a detailed example of the IC tag reader 105 will be described later) capable of communicating with the IC tag 81 communicates directly with the rotary atomizing head 21-1 in a standalone component state. As illustrated in FIG. 6, if the IC tag 81 is disposed such that the surface of the coil antenna 93 built in the IC tag 81 is parallel to or makes the predetermined inclination angle with the cross section of the groove of the cutout portion of the attachment part 52, the magnetic field $\phi$ perpendicularly entering and exiting from the surface of the coil antenna 93 is capable of easily passing through the groove of the cutout portion of the attachment part 52 (that is, a resin portion of the resin mold 101) serving as a magnetic path. This enables the good communication of the IC tag 81 and the IC tag reader 105.

Incidentally, the result of actual evaluation has made it clear that, in a case where the atomizing head main body 51 has a typical diameter dimension (7 cm, 5 cm, 4 cm), Hitachi Chemical IM5-PK2525 is used as the IC tag 81, a frequency is 920 Hz, and an output is 30 dBm, the IC tag 81 of the rotary atomizing head 21-1 and the IC tag reader 105 can have a communication distance of 10 cm or more.

Figure 7:
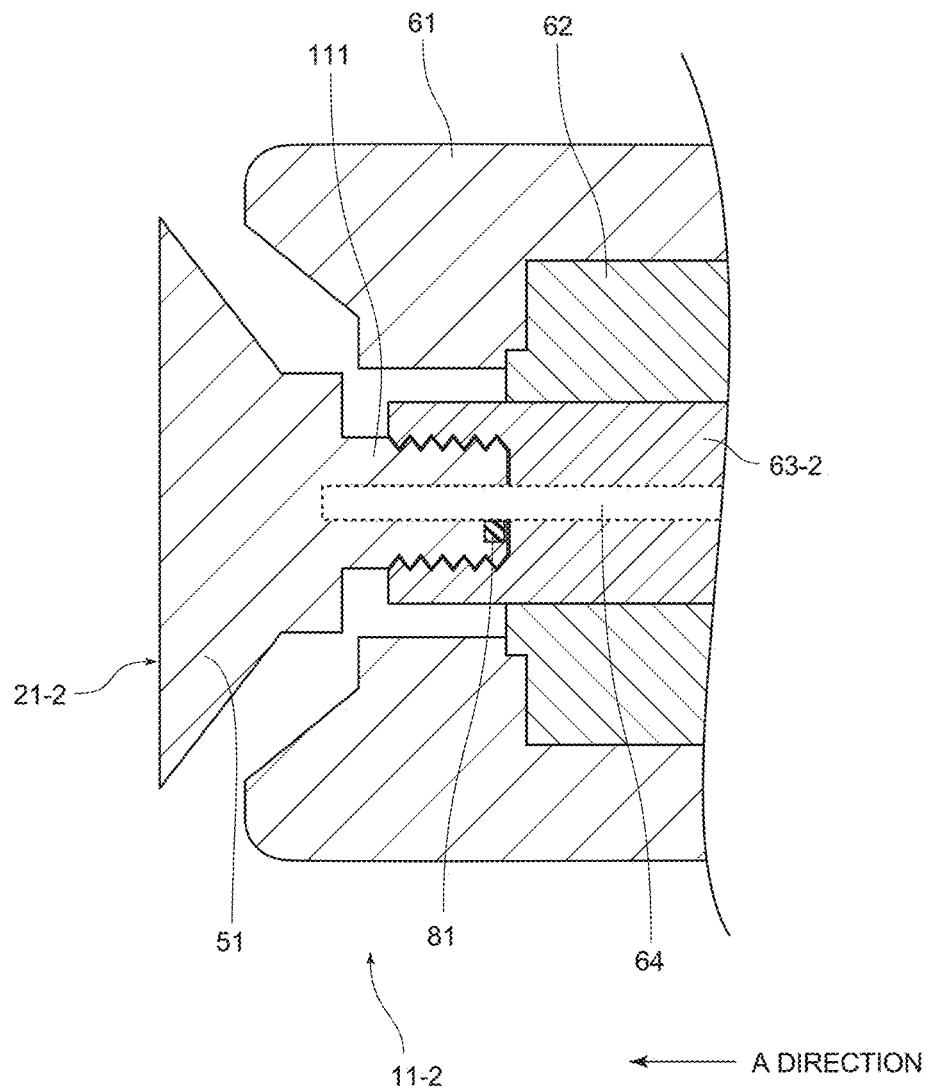
FIG. 7 is a sectional view of a tip portion of a rotary atomizing head type painting device 11-2 according to a second example.

Next, a second example of the rotary atomizing head type painting device 11 will be described. FIG. 7 illustrates a sectional view of a tip portion of a rotary atomizing head type painting device 11-2 according to the second example.

The rotary atomizing head type painting device 11-2 in FIG. 7 is basically the same as in the case described using FIG. 2 except that it is provided with a rotary atomizing head 21-2 in place of the rotary atomizing head 21-1, and is provided with a rotary shaft 63-2 whose tip portion outer periphery has a female-threaded structure, in place of the rotary shaft 63-1, and therefore a detailed description thereof will be skipped.

In the rotary atomizing head 21-2, an attachment part 111 having a male screw structure is provided in place of the attachment part 52 of the rotary atomizing head 21-1. The IC tag 81 storing the model and other unique information of the rotary atomizing head 21-2 is attached to the attachment part 111. Here as well, in the attachment of the IC tag 81, it is necessary to achieve the good communication, to prevent it from obstructing the flow path of the compressed air jetted from the shaping air nozzle 61, and to prevent it from coming off due to the centrifugal force even when the rotary atomizing head 21-2 rotates at a high speed.

Figure 8:
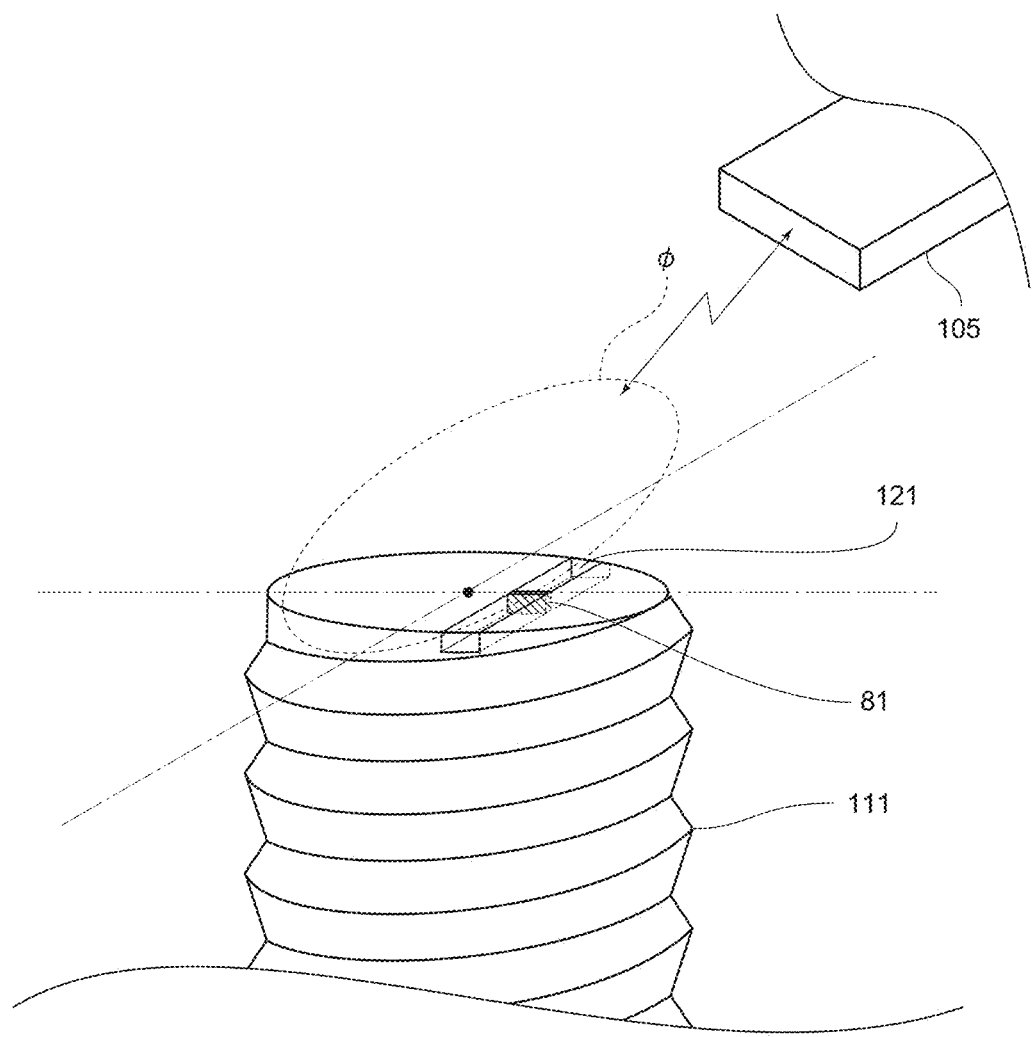
FIG. 8 is a view for explaining the attachment of the IC tag 81 to a rotary atomizing head 21-2.

In the attachment part 111 of the rotary atomizing head 21-2 in FIG. 7, in order to prevent the IC tag 81 from coming off at a high speed rotation, as illustrated in FIG. 8, a groove-shaped cutout portion is formed in an end portion of the attachment part 111 made of metal, at such a position that the cutout portion does not pass through the cylindrical center of the attachment part 111, and a resin mold 121 in which the IC tag 81 is embedded is attached to the groove portion. In this case as well, it suffices that the sectional size of the groove of the cutout portion is large enough for the IC tag 81 to be disposed therein such that the surface of the coil antenna 93 of the IC tag 81 is parallel to or makes a predetermined inclination angle with the cross section of the groove of the cutout portion of the attachment part 111.

FIG. 8 illustrates a magnetic field $\phi$ in a case where the IC tag reader 105 (a detailed example of the IC tag reader 105 will be described later) capable of communicating with the IC tag 81 communicates directly with the rotary atomizing head 21-2 in a standalone component state. In this case as well, the IC tag 81 is disposed such that the surface of the coil antenna 93 built in the IC tag 81 is parallel to or makes a predetermined inclination angle with the cross section of the attachment part 111, the magnetic field $\phi$ perpendicularly entering and exiting from the surface of the coil antenna 93 is capable of easily passing through the groove of the cutout portion of the attachment part 111 (that is, a resin portion of the resin mold 121) serving as a magnetic path. This enables the good communication of the IC tag 81 and the IC tag reader 105.

Next, the management of the rotary atomizing head in the first example and the second example of the rotary atomizing head type painting device 11 described above will be described with reference to the functional block diagram in FIG. 9.

The IC tag reader 105 which communicates with the IC tag 81 attached to the attachment part 52 or 111 may be housed in the explosion-proof purge 41 of the painting robot 1 or may be of a handy type. The IC tag reader 105 is connected to a data center 133 via a predetermined network 132 such as the Internet or Local Area Network (LAN). The data center 133 is constituted by an external information process device different from the painting device, and in the data center 133, information for part management, maintenance management, work instruction, and so on of the painting device composed of the painting robot 1 and the rotary atomizing head type painting device 11 is registered, and process is executed based on a user's operation input and various programs, and the data center 133 transmits various kinds of information, control commands, and so on to the painting robot 1 and the IC tag reader 105 as required.

Here, the IC tag reader 105 is a management device having not only a function of communicating information with the IC tag 81 but also a function of determining whether or not the rotary atomizing head 21-1 or 21-2 is a component usable for the work. The IC tag reader 105 includes an IC tag communication unit 141, a control unit 142, a network communication unit 143, a memory 144, and an output control unit 145.

Here, the IC tag communication unit 141 executes the communication with the IC tag 81 based on the control by the control unit 142, and supplies its result to the control unit 142. Note that the IC tag communication unit 141 corresponds to the IC tag communication means for radiating a communication radio wave to space.

The control unit 142 not only controls the operation of the IC tag reader 105 based on a user's operation which is input through a not-illustrated operation input part or based on information or a command from the data center 133, which is supplied from the network communication unit 143, but also has a function of determining whether or not the rotary atomizing head 21-1 or 21-2 is a component usable for the work. Specifically, the control unit 142 controls the IC tag communication unit 141 to cause it to execute the communication with the IC tag 81, and obtains information stored in the IC tag 81. Further, based on the information stored in the IC tag 81, the control unit 142 determines whether or not the corresponding rotary atomizing head 21-1 or 21-2 is the component usable for the work. Further, the control unit 142 controls the network communication unit 143 to cause it to execute the exchange of various kinds of information with the data center 133 via the network 132. Further, the control unit 142 controls the output control unit 145 to cause it to execute the control of the output of a message to a user. Note that the control unit 142 corresponds to the determination means.

The network communication unit 143 exchanges information with an external information processing device via the network 132. Specifically, the network communication unit 143 transmits information supplied from the control unit 142, to the data center 133 via the network 132, and also receives information transmitted from the data center 133 via the network 132 to supply it to the control unit 142. Note that the network communication unit 143 corresponds to the information exchange means.

The memory 144 stores a program which is to be executed by the control unit 142 and information necessary for processing of the control unit 142.

Based on the control by the control unit 142, the output control unit 145 controls, for example, a display device such as a display (not illustrated) or an audio output device (not illustrated) such as a speaker to control the output of a message to a user by means of an image or a text or by means of sound.

Next, management processing of the rotary atomizing head 21-1 or 21-2 executed by the IC tag reader 105 will be described with reference to the flowchart in FIG. 10.

At Step S1, the IC tag communication unit 141 executes a communication process with the IC tag 81 based on the control by the control unit 142. That is, the control unit 142 instructs the IC tag communication unit 141 to read the information recorded in the IC tag 81. The IC tag communication unit 141 transmits a call radio wave of the IC tag communication and receives a radio wave including the tag information from the IC tag 81. The IC tag communication unit 141 supplies the received information to the control unit 142. Note that this process corresponds to the IC tag communication step.

At Step S2, based on the information supplied from the IC tag communication unit 141, the control unit 142 determines whether or not the rotary atomizing head 21-1 or 21-2 in which the IC tag 81 currently under communication is embedded is a component having a proper specification. Note that this process corresponds to the determination step. In a case where it is determined at Step S2 that the rotary atomizing head 21-1 or 21-2 is not the component having the proper specification, the processing goes to later-described Step S5.

Here, information about the proper component specification may be supplied from the data center 133 in advance via the network 132 to be stored in the memory 144, or under the control by the control unit 142, an inquiry about the information about the proper component specification may be made to the data center 133 via the network 132 so that a reply thereto can be received. Further, information supplied from the IC tag communication unit 141 may be transmitted to the data center 133 via the network 132 under the control by the control unit 142 so that a reply indicating whether or not the rotary atomizing head 21-1 or 21-2 is the component having the proper specification can be received.

In a case where it is determined at Step S2 that the rotary atomizing head 21-1 or 21-2 is the component having the proper specification, the control unit 142 determines at Step S3 whether or not a limit use time (period) of the rotary atomizing head 21-1 or 21-2 in which the IC tag 81 currently under communication is embedded is within a scheduled work time, based on the information supplied from the IC tag communication unit 141. The limit use time (period) refers to a usable time or period set for each component, and corresponds to component life or the like, for instance. Note that this process corresponds to the determination step. In a case where it is determined at Step S3 that the limit use time (period) is not within the scheduled work time, the process goes to later-described Step S5.

Here as well, information about the limit use time (period) and the scheduled work time may be supplied from the data center 133 in advance via the network 132 to be stored in the memory 144, or an inquiry about the information about the limit use time (period) and the scheduled work time may be made to the data center 133 via the network 132 under the control by the control unit 142 so that a reply thereto can be received. Further, information supplied from the IC tag communication unit 141 may be transmitted to the data center 133 via the network 132 under the control by the control unit 142 so that a reply indicating whether or not the limit use time (period) is within the scheduled work time can be received.

In a case where it is determined at Step S3 that the limit use time (period) is within the scheduled work time, the control unit 142 supplies, at Step S4, the output control unit 145 with a control signal for causing the notification that the work can be executed. Based on the control by the control unit 142, the output control unit 145 controls the operation of, for example, the display device such as the display or the audio output device such as the speaker to cause a message indicating that the work can be executed to be output by means of an image or a text or by means of sound. Further, the control unit 142 controls the network communication unit 143 to cause it to transmit, to the data center 133, information indicating that the rotary atomizing head 21-1 or 21-2 in which the IC tag 81 currently under communication is embedded is a proper component for the work. The network communication unit 143 transmits the information supplied from the control unit 142 to the data center 133 via the network 132, and the process is ended.

In the case where it is determined at Step S2 that the rotary atomizing head 21-1 or 21-2 is not the component having the proper specification or in the case where it is determined at Step S3 that the limit use time (period) is not within the scheduled work time, the control unit 142 executes, at Step S5, a process for notifying and recording the error contents, and the process is ended. Specifically, the control unit 142 supplies the output control unit 145 with a control signal for causing the notification of the error contents. Based on the control by the control unit 142, the output control unit 145 controls the operation of, for example, the display device such as the display or the audio output device such as the speaker to cause a message indicating the error contents to be output by means of an image or a text or by means of sound. Further, the control unit 142 records the error contents in the memory 144, or controls the network communication unit 143 to cause the error contents to be transmit to and recorded in the data center 133 via the network 132.

Through the above process, based on the information read from the IC tag 81, it is detected whether or not the rotary atomizing head 21-1 or 21-2, the rotary atomizing head type painting device 11-1 to which the rotary atomizing head 21-1 is attached, or the rotary atomizing head type painting device 11-2 to which the rotary atomizing head 21-2 is attached conforms to the specification of the work instruction and whether or not its remaining life exceeds the process time, and it is able to execute inspection before the start of the work and safety inspection.

Incidentally, in the description here, whether or not the rotary atomizing head 21-1 or 21-2 is the component having the proper specification and whether or not the limit use time (period) is within the scheduled work time are checked, but it goes without saying that the same process is executed also in a case where other necessary items are checked.

Figure 11:
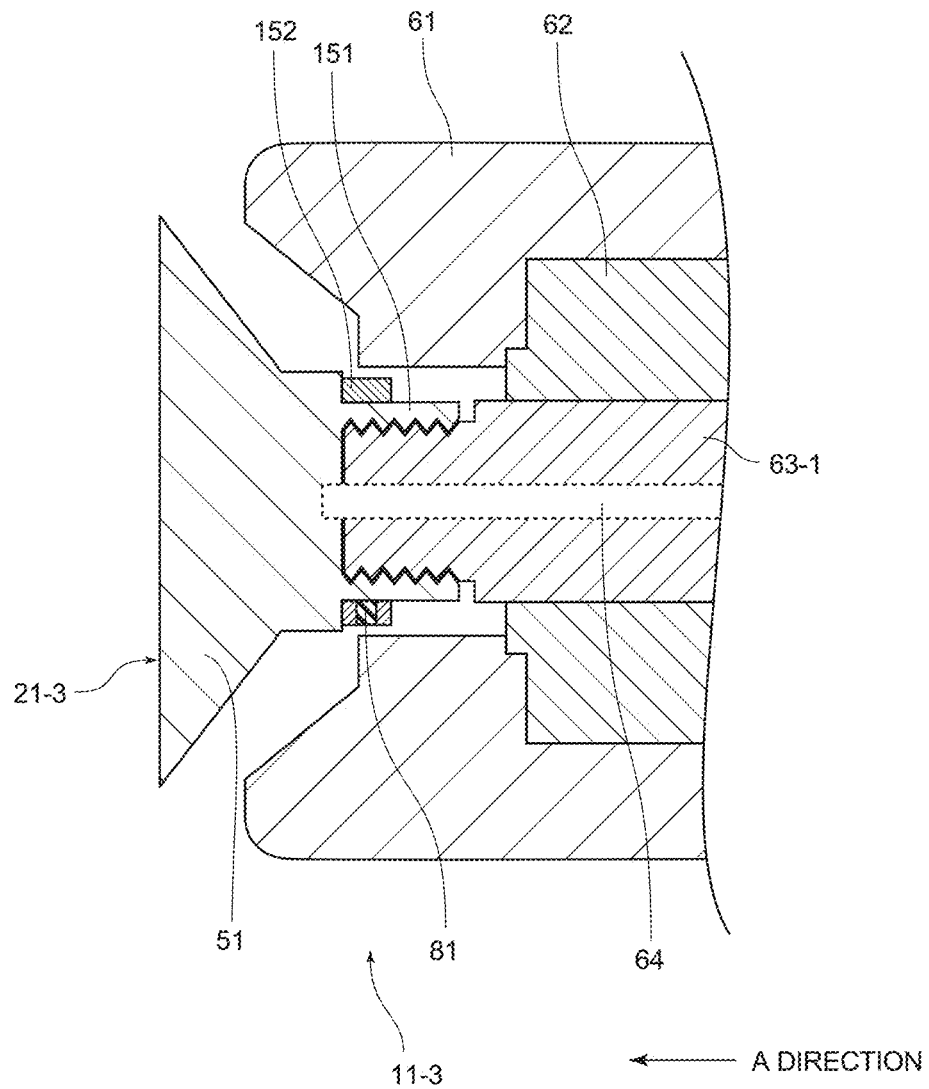
FIG. 11 is a sectional view of a tip portion of a rotary atomizing head type painting device 11-3 according to a third example.

Next, a third example of the rotary atomizing head type painting device 11 will be described. FIG. 11 illustrates a sectional view of a tip portion of the rotary atomizing head type painting device 11-3 according to the third example.

The rotary atomizing head type painting device 11-3 in FIG. 11 is basically the same as in the case described using FIG. 2 except that it is provided with a rotary atomizing head 21-3 in place of the rotary atomizing head 21-1, and therefore a detailed description thereof will be skipped. In the rotary atomizing head 21-3, the IC tag 81 is attached by a resin mold 152 to an outer portion of an attachment part 151 made of metal.

Figure 12:
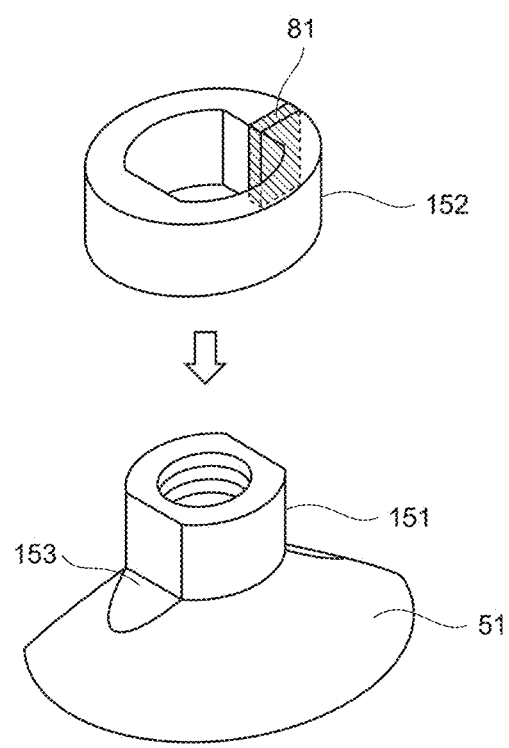
FIG. 12 is a view for explaining the attachment of the IC tag 81 to a rotary atomizing head 21-3.

Next, a method of attaching the IC tag 81 to the rotary atomizing head 21-3 will be described with reference to FIG. 12 and FIG. 13. FIG. 12 illustrates a schematic view of how the resin mold 152 in which the IC tag 81 is attached is fitted to the atomizing head main body 51 and the attachment part 151. Further, the upper drawing in FIG. 13 is a view of the attachment part 151 of the rotary atomizing head 21-3 seen in the A direction indicated in FIG. 11, and the lower drawing in FIG. 13 is a side view of the rotary atomizing head 21-3.

As described above, the IC tag 81 has to be attached so as not to come off the rotary atomizing head 21-3 which rotates at a high speed. For this purpose, the resin mold 152 in which the IC tag 81 is embedded is attached to the outer portion of the attachment part 151 made of metal, at such a position that the resin mold 152 does not obstruct the flow path of the compressed air. In the rotary atomizing head 21-3, as illustrated in FIG. 12, an outer shape of the attachment part 151 made of metal agrees with an inner peripheral shape of the resin mold 152 having a cylindrical outer periphery so that the resin mold 152 in which the IC tag 81 is embedded can be fitted to the outer side of the attachment part 151. In a contact portion of the atomizing head main body 51 and the attachment part 151, cutouts 153 worked so as to keep balance to cancel rotation eccentricity are provided at two places respectively.

The IC tag 81 is embedded in the resin mold 152 such that the surface of its internal coil antenna 93 is perpendicular to a circumferential direction along the outer periphery of the resin mold, that is, a magnetic field perpendicularly entering and exiting from the surface of the coil antenna 93 is capable of easily passing through a magnetic path, that is, the resin mold 152 and a space with which it is in contact. This enables the good communication between the IC tag 81 and an IC tag reader.

Figure 13:
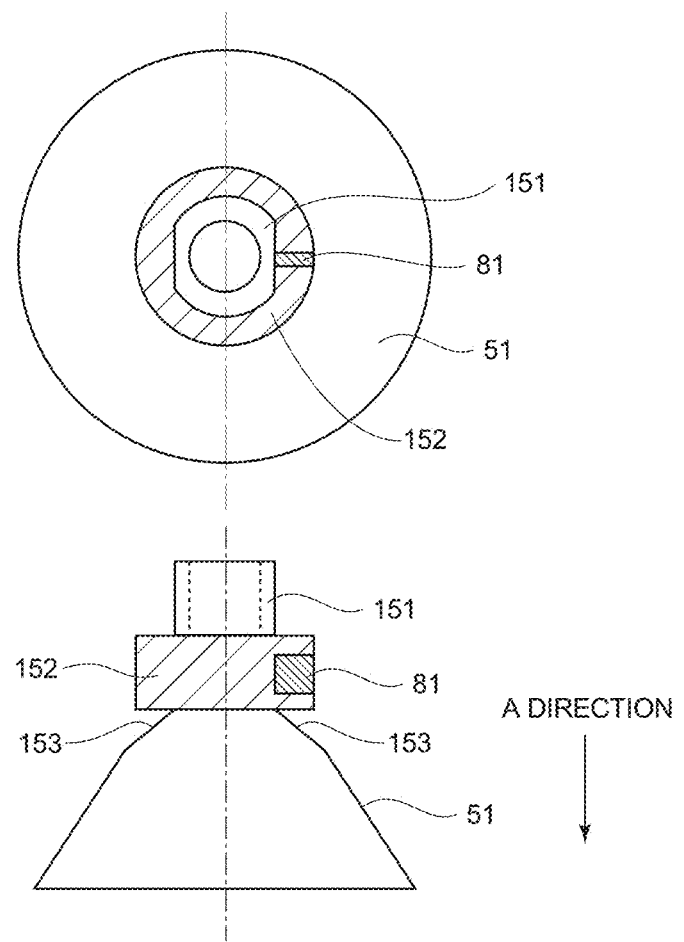
FIG. 13 is a view for explaining the attachment of the IC tag 81 to the rotary atomizing head 21-3.

The rotary atomizing head 21-3 described using FIG. 11 to FIG. 13 is capable of communicating with the IC tag reader present at a position outside and near the rotary atomizing head type painting device 11-3, not only in a standalone component state but also in a state where the rotary atomizing head 21-3 is mounted on the rotary shaft 63-1.

Next, the communication between the IC tag 81 attached to a screw portion of the rotary atomizing head 21-3 and the IC tag reader will be described with reference to FIG. 14 and FIG. 15.

Here, a space outside the shaping air nozzle 61 on which the rotary atomizing head 21-3 is mounted will be referred to as an external space, and a space which is the inside of the shaping air nozzle 61 and in which the IC tag 81 is installed will be referred to as an internal space.

A call radio wave of the IC tag communication radiated from the IC tag reader (not illustrated) reaches the rotary atomizing head 21-3 and the shaping air nozzle 61 via the external space. The call radio wave hits on metal surfaces of the rotary atomizing head 21-3 and the shaping air nozzle 61, and a high-frequency current i flows on their surfaces. The high-frequency current i flows to their metal surfaces in the internal space sandwiched by the rotary atomizing head 21-3 and the shaping air nozzle 61 in opposite directions. The internal space is the flow path of the compressed air discharged from the shaping air nozzle 61 in some cases.

As described above, the rotary atomizing head 21-3 is supported inside the shaping air nozzle 61 via the air bearing. Accordingly, in a support portion, the high-frequency current i is in a capacitive coupling (coupling) state. That is, the high-frequency current i flowing to the metal surfaces forming the internal space flows to the outer metal surface of the shaping air nozzle 61.

Figure 15:
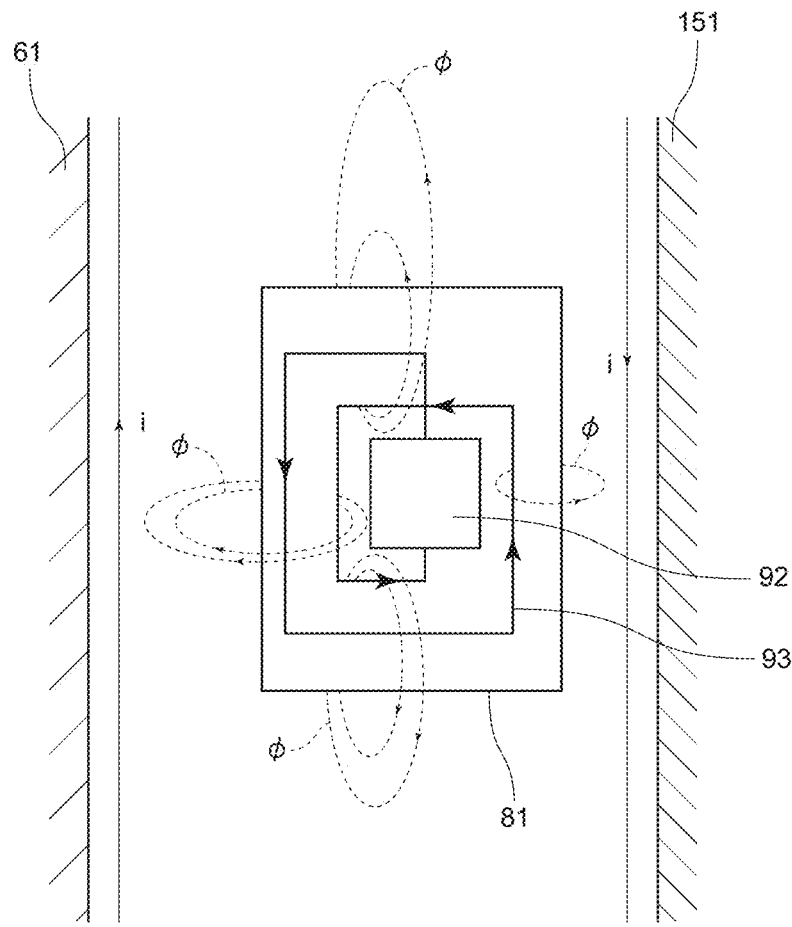
FIG. 15 is a view for explaining the IC tag 81, a high-frequency current, and magnetic field coupling.

That is, as illustrated in FIG. 15, the magnetic-field-coupling of the nearby high-frequency current i flowing in parallel to the coil antenna 93 built in the IC tag 81 is caused by electromagnetic induction (mutual induction). Due to a magnetic field ϕ at this time, the high-frequency current i flows to (excites) the coil antenna 93, so that the IC chip 92 operates. When the IC chip 92 operates, the tag information flows to the high-frequency current i, is conveyed to the magnetic field ϕ and the high-frequency current i flowing out to the external space along the metal surface, and is propagated to a standing wave created by the high-frequency current i, so that the radio wave containing the information stored in the IC chip 92 is radiated to the external space. This radio wave is receive by the IC tag reader again, whereby the IC tag communication is established.

As the communication distance with the IC tag reader is longer, the high-frequency current i flowing on the metal surface is smaller, and the excitation sufficient for operating the IC tag 81 does not occur. Therefore, as a means for obtaining the good communication even when the distance to the IC tag reader is long, the call radio wave output of the IC tag reader is increased or the resonance of the high-frequency current i is caused. The intensity of the resonance of the high-frequency current i is larger as the cup diameter of the rotary atomizing head 21-3 is closer to λ/4.

Figure 14:
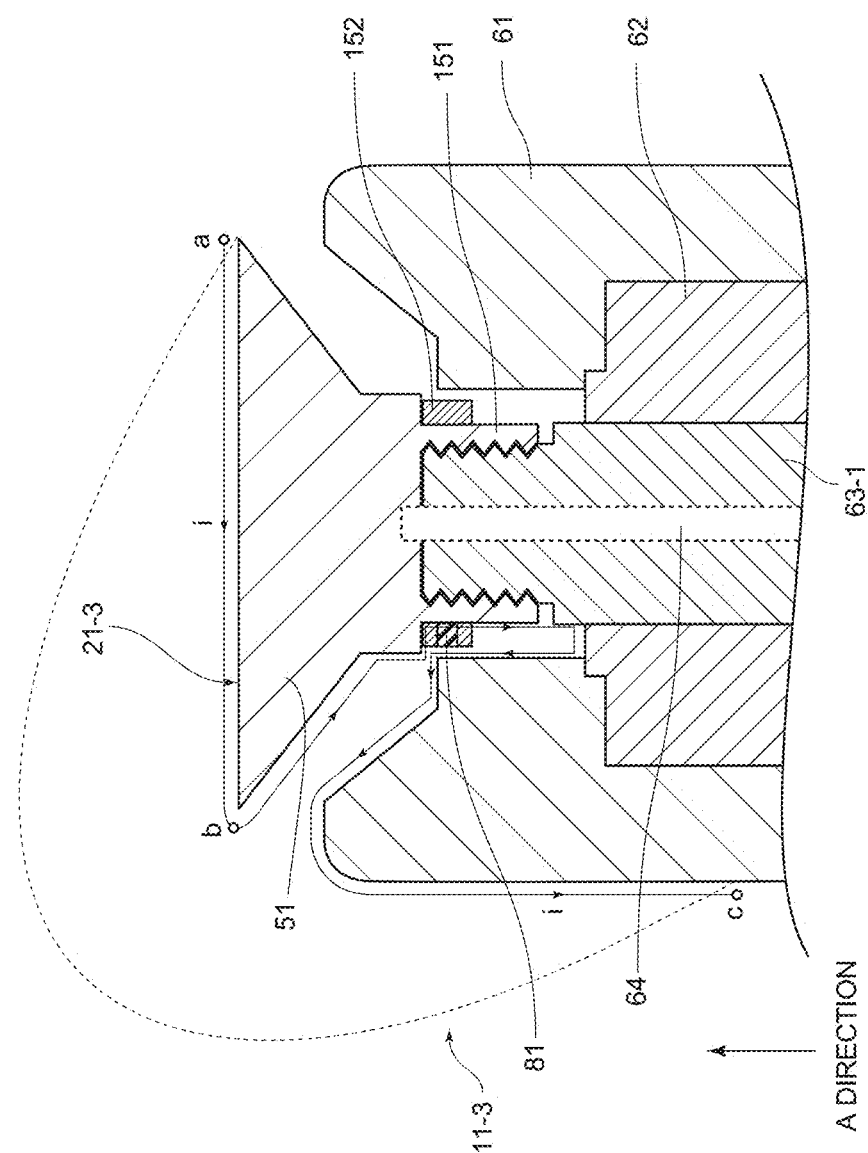
FIG. 14 is a view for explaining communication between the IC tag 81 and an IC tag reader.

In FIG. 14, the broken line indicates the intensity of the high-frequency current i depending on a place. If the cup diameter of the rotary atomizing head 21-3 is λ/4 (λ is a wavelength, and is 32 cm in a case of 920 MHz, for instance), the high-frequency current i departing from the point indicated by a in the drawing becomes largest at the point indicated by b in the drawing, that is, at a jet port of the compressed air from the shaping air nozzle 61. Then, the high-frequency current i becomes 0 at the point indicated by c in the drawing whose distance from the point indicated by b in the drawing along the side surface of the shaping air nozzle 61 is λ/4. That is, the current intensity of the high-frequency current i distributes in a sine wave shape. This agrees with the distribution of a standing wave generated by a high-frequency current known in electromagnetics.

Incidentally, the result of actual evaluation has made it clear that, in a case where the atomizing head main body 51 has a typical diameter dimension (7 cm, 5 cm, 4 cm), Hitachi Chemical IM5-PK2525 is used as the IC tag 81, a frequency is 920 Hz, and an output is 30 dBm, the IC tag 81 of the rotary atomizing head 21-3 can have the communication distance of 10 cm or more when the rotary atomizing head 21-3 is in the standalone component state, and can have the communication distance of 3 cm or more when the rotary atomizing head 21-3 is in the state of being mounted on the rotary shaft 63-1. It should be noted that this condition is not the best condition for increasing the communication distance, unlike λ/4(=about 8 cm) of the diameter of the atomizing head main body 51 with respect to the wavelength of the used radio wave, which is the condition under which the high-frequency current i resonates.

Figure 16:
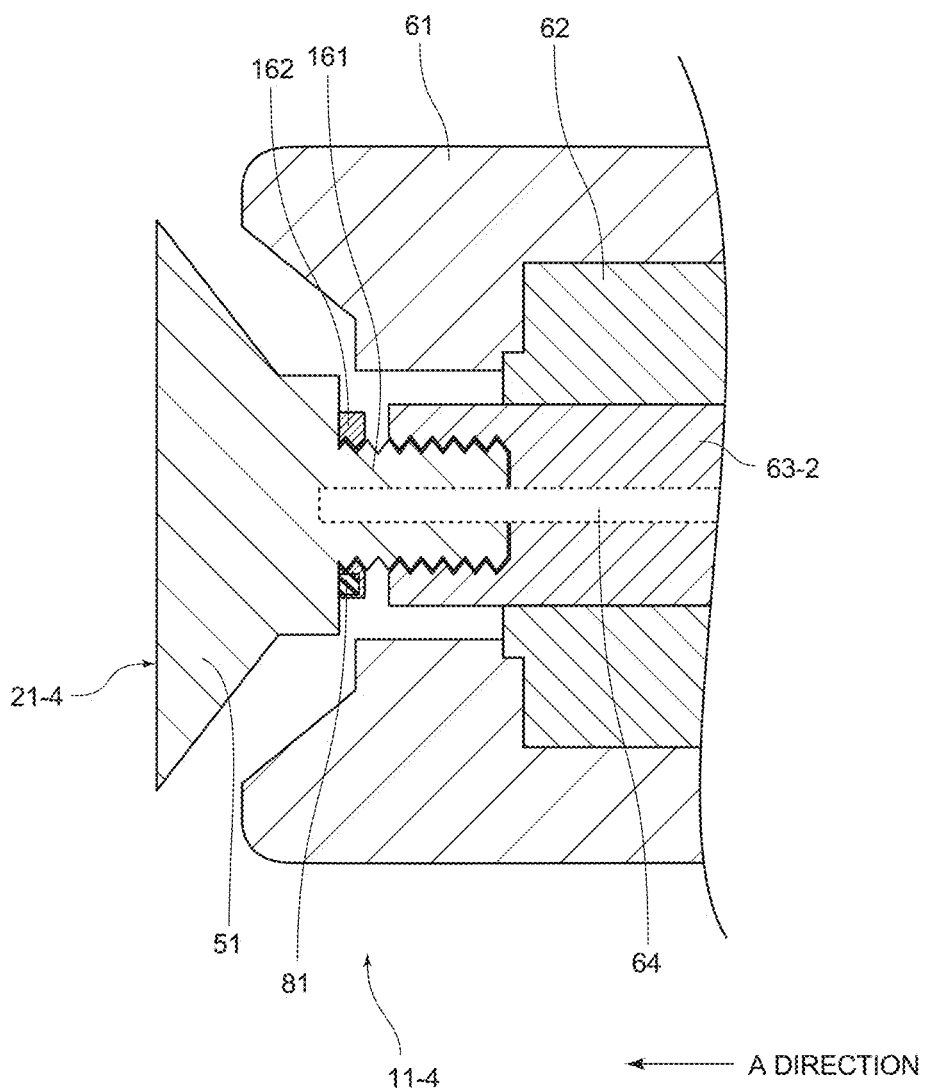
FIG. 16 is a sectional view of a tip portion of a rotary atomizing head type painting device 11-4 according to a fourth example.

Next, a fourth example of the rotary atomizing head type painting device 11 will be described. FIG. 16 illustrates a sectional view of a tip portion of the rotary atomizing head type painting device 11-4 according to the fourth example. In the rotary atomizing head type painting device 11-4 in FIG. 16, a rotary shaft 63-2 is provided in place of the rotary shaft 63-1, and a rotary atomizing head 21-4 is provided in place of the rotary atomizing head 21-1. The rotary atomizing head 21-4 includes an atomizing head main body 51 and an attachment part 161, and the IC tag 81 is attached by a resin mold 162 to an outer portion of the attachment part 161 made of metal. A screw portion of the attachment part 161 of the rotary atomizing head 21-4 has a male screw structure so as to be capable of being screwed to the rotary shaft 63-2 having a female screw structure. Except for this, it is basically the same as in the case described using FIG. 2, and a detailed description thereof will be skipped.

Figure 17:
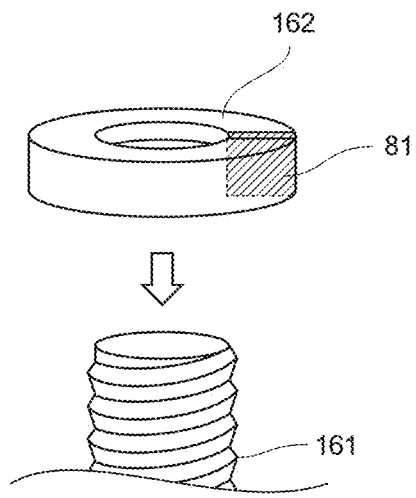
FIG. 17 is a view for explaining the attachment of the IC tag 81 to a rotary atomizing head 21-4.

Next, a method of attaching the IC tag 81 to the rotary atomizing head 21-4 will be described with reference to FIG. 17 and FIG. 18. FIG. 17 illustrates a schematic view of how the resin mold 162 in which the IC tag 81 is attached is screwed to the atomizing head main body 51 and the attachment part 161. Further, the upper drawing in FIG. 18 is a view of the rotary atomizing head 21-4 seen in the A direction indicated in FIG. 16, and the lower drawing in FIG. 18 is a side view of the rotary atomizing head 21-4.

As described above, the IC tag 81 needs to be attached so as not to come off the rotary atomizing head 21-4 which rotates at a high speed. For this purpose, the resin mold 162 in which the IC tag 81 is embedded is attached to the outer portion of the attachment part 161 made of metal, at such a position that the resin mold 162 does not obstruct the flow path of the compressed air. In the rotary atomizing head 21-4, as illustrated in FIG. 17, the cylindrical resin mold 162 has a female-threaded inner periphery so that it can be screwed to the outer male-threaded portion of the attachment part 161 made of metal, whereby the resin mold 162 in which the IC tag 81 is embedded can be screwed to the outer side of the attachment part 161.

The IC tag 81 is embedded in the resin mold 162 such that the surface of its internal coil antenna 93 is perpendicular to a circumferential direction along an outer periphery of the resin mold, that is, a magnetic field perpendicularly entering and exiting from the surface of the coil antenna 93 can easily pass through a magnetic path, that is, the resin mold 162 and a space with which it is in contact. This enables the good communication between the IC tag 81 and the IC tag reader.

Figure 18:
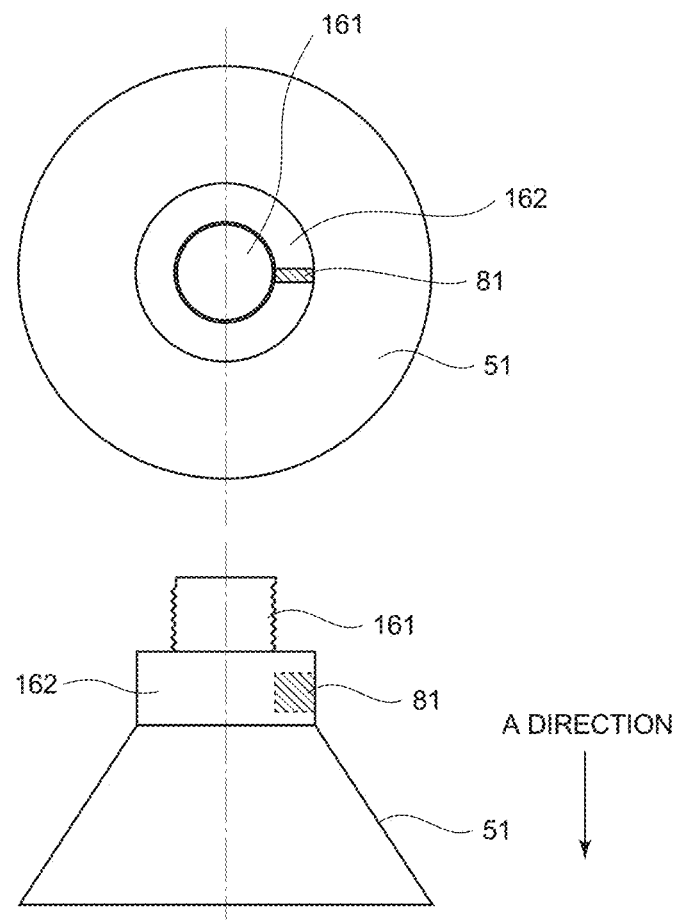
FIG. 18 is a view for explaining the attachment of the IC tag 81 to the rotary atomizing head 21-4.

The rotary atomizing head 21-4 described using FIG. 16 to FIG. 18 is capable of communicating with the IC tag reader present at a position outside and near the rotary atomizing head type painting device 11-4, not only in a standalone component state but also in a state where the rotary atomizing head 21-4 is mounted on the rotary shaft 63-2. A detailed description thereof is basically the same as in the case described using FIG. 14 and FIG. 15, and therefore will be skipped.

Further, in the third example and the fourth example of the rotary atomizing head type painting device 11 described using FIG. 11 to FIG. 18, it is possible to manage the rotary atomizing head 21 in the same manner as in the above-described cases in the first example and the second example of the rotary atomizing head type painting device 11. In addition, in the third example and the fourth example of the rotary atomizing head type painting device 11, in the state where the rotary atomizing head 21-3 or 21-4 is mounted on the rotary shaft 63-1 or 63-2, it is also possible to execute the IC tag communication and to perform the same management process.

Next, a case where, in the above-described third example and fourth example of the rotary atomizing head type painting device 11, the IC tag communication is executed and managed in the state where the rotary atomizing head 21-3 or 21-4 is mounted on the rotary shaft 63-1 or 63-2 will be described with reference to the functional block diagram in FIG. 19.

Figure 9:
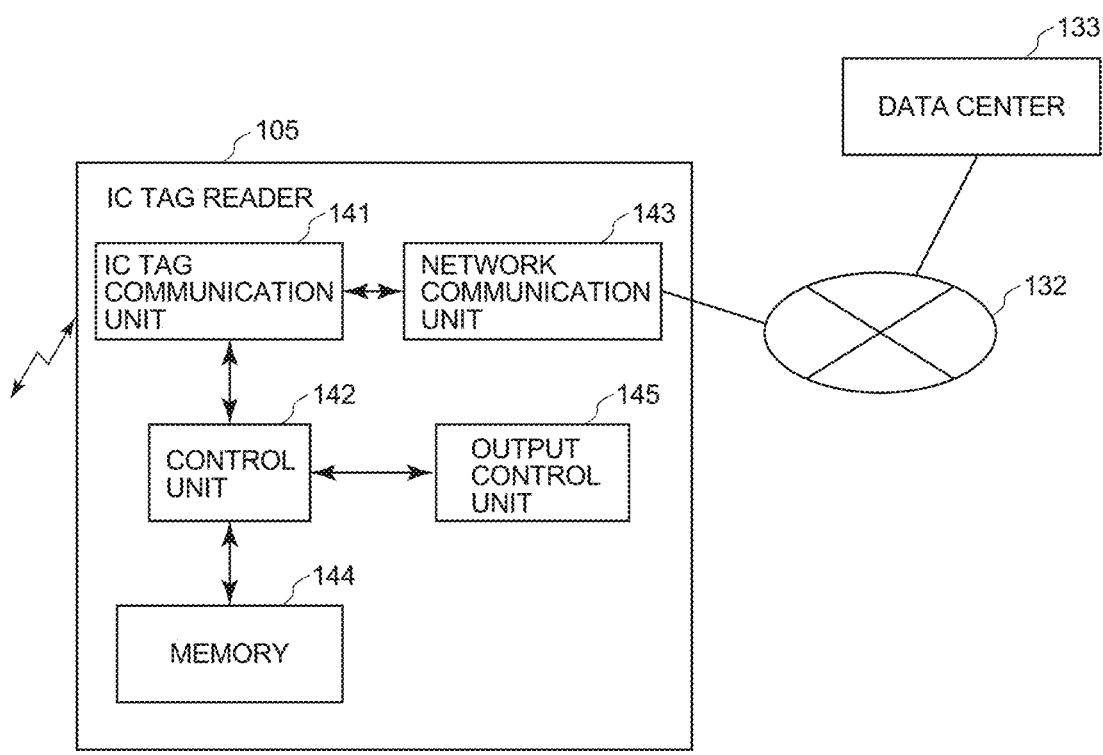
FIG. 9 is a functional block diagram to explain the management of the rotary atomizing head.
Figure 19:
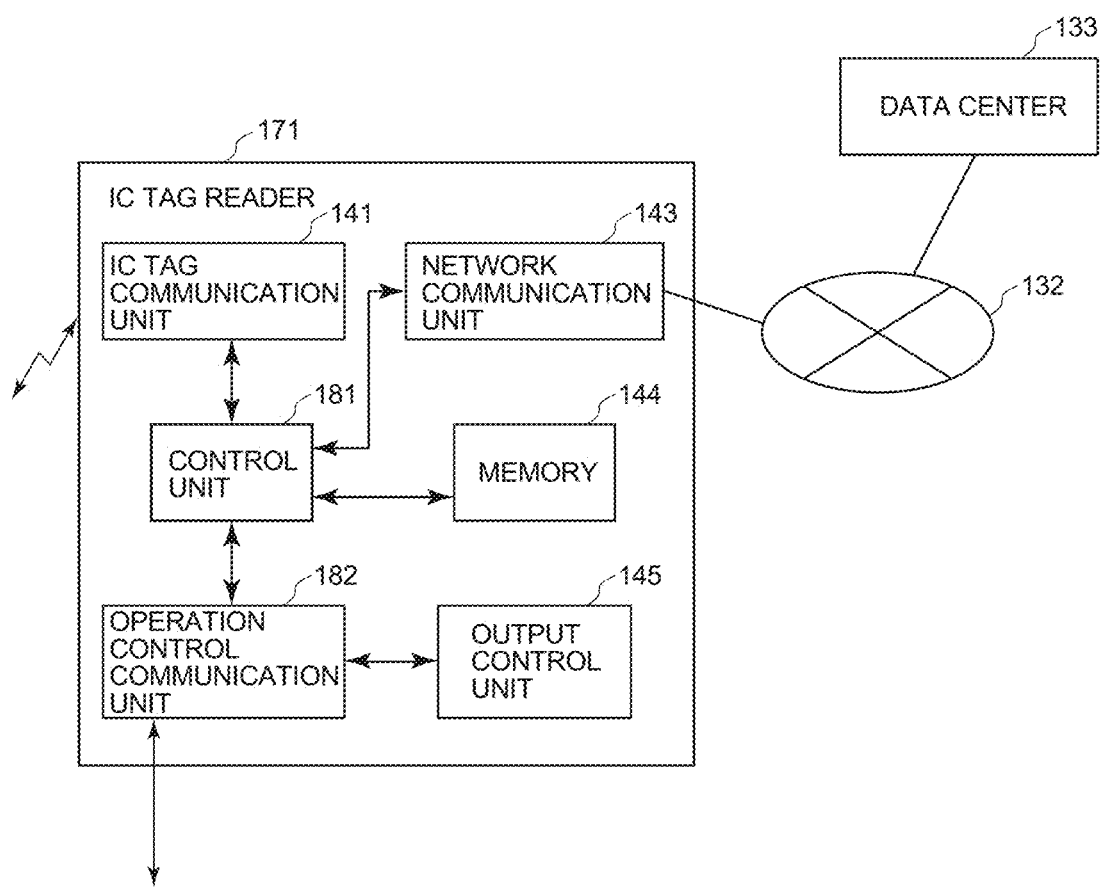
FIG. 19 is a functional block diagram to explain the management of the rotary atomizing head.

In the functional block diagram in FIG. 19, the same parts as those in the functional block diagram described using FIG. 9 are denoted by the same reference signs, and detailed descriptions thereof will be skipped.

Specifically, an IC tag reader 171 which communicates with the rotary atomizing head 21-3 or the rotary atomizing head 21-4 has the same configuration as that of the IC tag reader 105 described using FIG. 9 except that it is provided with a control unit 181 in place of the control unit 142 and newly provided with an operation control communication unit 182, and therefore detailed descriptions of corresponding parts will be skipped.

The IC tag reader 171 which communicates with the IC tag 81 attached to the attachment part 151 or 161 is housed in the explosion-proof purge 41 of the painting robot 1. The IC tag reader 171 has not only a function of a reader which exchanges information with the IC tag 81 but also a function as a management device which determines whether or not the rotary atomizing head 21-3 or 21-4 is a component usable for the work.

The control unit 181 not only controls the operation of the IC tag reader 171 based on a user's operation which is input through a not-illustrated operation input part, or based on information or a command from the data center 133, which is supplied from the network communication unit 143, but also has a function of determining whether or not the rotary atomizing head 21-3 or 21-4 is a component usable for the work. Specifically, the control unit 181 controls the IC tag communication unit 141 to cause it to communicate with the IC tag 81, and obtains information stored in the IC tag 81. Further, based on the information stored in the IC tag 81, the control unit 181 determines whether or not the corresponding rotary atomizing head 21-3 or 21-4 is a component usable for the work. Further, the control unit 181 controls the network communication unit 143 to cause it to execute the exchange of various kinds of information with the data center 133 via the network 132. Further, the control unit 181 controls the output control unit 145 to cause it to execute the control of the output of a message to a user.

Further, the control unit 181 generates a control signal instructing the operation control unit (not illustrated) which controls the operations of the vertical arm 32, the horizontal arm 33, and so on of the painting robot 1, to control the operation, and causes the control signal to be supplied to the operation control unit via the operation control communication unit 182. Further, the control unit 181 obtains, via the operation control communication unit 182, work-related information supplied from the operation control unit and controls the network communication unit 143 to cause it to transmit the work-related information to the data center 133 via the network 132. Note that the control unit 181 corresponds to the determination means.

The operation control communication unit 182 supplies the control signal supplied from the control unit 181, to the operation control unit which controls the operations of the vertical arm 32, the horizontal arm 33, and so on of the painting robot 1, and also supplies the control unit 181 with the work-related information supplied from the operation control unit. Note that the operation control communication unit 182 corresponds to the control information exchange means.

Next, management processing of the rotary atomizing head 21-3 or 21-4 executed by the IC tag reader 171 will be described with reference to the flowchart in FIG. 20.

At Step S11, the control unit 181 generates a control signal for controlling the operations of the vertical arm 32 and the horizontal arm 33 of the painting robot 1 so as to make the rotary atomizing head 21-3 or the rotary atomizing head 21-4 approach the explosion-proof purge 41, and causes the control signal to be supplied to the not-illustrated operation control unit via the operation control communication unit 182. The operation control unit controls the operations of the vertical arm 32 and the horizontal arm 33 to cause the rotary atomizing head 21-3 or the rotary atomizing head 21-4 to approach the explosion-proof purge 41.

Figure 10:
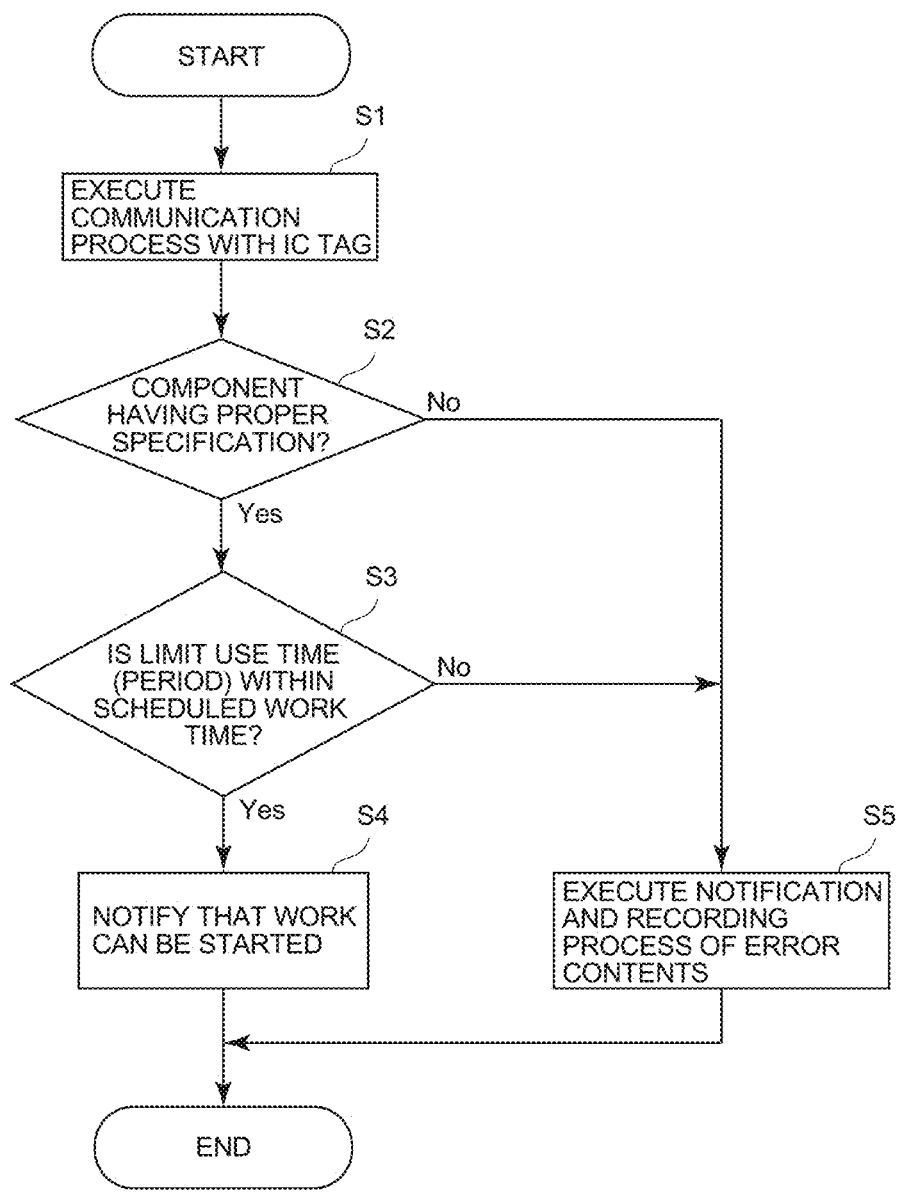
FIG. 10 is a flowchart to explain management processing of the rotary atomizing head 21-1 or 21-2.

At Step S12 to Step S14, the same processes as those at Step S1 to Step S3 described using FIG. 10 are executed. Specifically, at Step S12, the IC tag communication unit 141 executes a communication process with the IC tag 81 based on the control by the control unit 181. Note that this process corresponds to the IC tag communication step. At Step S13, the control unit 181 determines whether or not the rotary atomizing head 21-3 or 21-4 in which the IC tag 81 currently under communication is embedded is a component having a proper specification. Note that this process corresponds to the determination step. In a case where it is determined at Step S13 that the rotary atomizing head 21-3 or 21-4 is not the component having the proper specification, the process goes to later-described Step S15.

In a case where it is determined at Step S13 that the rotary atomizing head 21-3 or 21-4 is the component having the proper specification, the control unit 181 determines at Step S14 whether or not a limit use time (period) of the rotary atomizing head 21-3 or 21-4 in which the IC tag 81 currently under communication is embedded is within a scheduled work time. Note that this process corresponds to the determination step. In a case where it is determined at Step S14 that the limit use time (period) is not within the scheduled work time, the process goes to later-described Step S15.

In the case where it is determined at Step S13 that the rotary atomizing head 21-3 or 21-4 is not the component having the proper specification or in the case where it is determined at Step S14 that the limit use time (period) is not within the scheduled work time, the control unit 181 executes, at Step S15, a notification and recording process of the error contents, and the process is ended. Specifically, the control unit 181 supplies the output control unit 145 with a control signal for causing the error contents to be notified. Based on the control by the control unit 181, the output control unit 145 controls the operation of, for example, the display device such as the display or the audio output device such as the speaker to cause a message indicating the error contents to be output by means of an image or a text or by means of sound. Further, the control unit 181 records the error contents in the memory 144 or controls the network communication unit 143 to cause the error contents to be transmitted to and recorded in the data center 133 via the network 132.

In a case where it is determined at Step S14 that the limit use time (period) is within the scheduled work time, the control unit 181 executes a work start process at Step S16. Specifically, the control unit 181 supplies the output control unit 145 with a control signal for causing the notification that the work can be executed. Based on the control by the control unit 181, the output control unit 145 controls the operation of, for example, the display device such as the display or the audio output device such as the speaker to cause a message indicating that the work can be executed to be output by means of an image or a text or by means of sound.

Further, the control unit 181 controls the network communication unit 143 to cause it to transmit, to the data center 133, information indicating that the rotary atomizing head 21-3 or 21-4 in which the IC tag 81 currently under communication is embedded is the proper component for the work. The network communication unit 143 transmits the information supplied from the control unit 181 to the data center 133 via the network 132. Then, the control unit 181 generates a control signal for instructing the operation control unit (not illustrated) which controls the operations of the vertical arm 32 and the horizontal arm 33 of the painting robot 1, to prepare for starting the work, and supplies the control signal to the operation control communication unit 182. The operation control communication unit 182 supplies the control signal supplied from the control unit 181, to the operation control unit to cause it to execute a work start preparation process. After the work is started, the operation control communication unit 182 supplies the control unit 181 with work-related information supplied from the operation control unit.

At Step S17, based on the signal supplied from the operation control communication unit 182, the control unit 181 determines whether or not the work is ended. In a case where it is determined at Step S17 that the work is not ended, the process at Step S17 is repeated until it is determined that the work is ended. During the work, the control unit 181 supplies the memory 144 with the work-related information supplied from the operation control communication unit 182 to cause the information to be recorded therein.

In a case where it is determined at Step S17 that the work is ended, the control unit 181 controls, at Step S18, the network communication unit 143 to cause it transmit, to the data center 133, a work-related log recorded in the memory 144. The network communication unit 143 transmits the work-related log supplied from the control unit 181 to the data center 133 via the network 132, and the process is ended.

Through the above process, based on the information read from the IC tag 81, whether or not the rotary atomizing head 21-3 or 21-4, the rotary atomizing head type painting device 11-3 to which the rotary atomizing head 21-3 is attached, or the rotary atomizing head type painting device 11-4 to which the rotary atomizing head 21-4 is attached conforms to the specification of the work instruction and whether or not the remaining life exceeds the process time are detected in a state where these components are attached, and it is possible to execute inspection before the start of the work and safety inspection.

Further, the automatic transmission of the work log to the data center after the end of the painting work facilitates maintenance such as cleaning process management, inventory check, and trace management such as keeping of maintenance parts.

In the description here, whether or not the rotary atomizing head 21-3 or 21-4 is the component having the proper specification and whether or not the limit use time (period) is within the scheduled work time are checked, but it goes without saying that the same process is executed also in a case where other necessary items are checked.

By thus enabling to perform the part recognition by means of the IC tag 81 and the self-check utilizing the IoT (Internet of Things) technology, using the part to which the IC tag 81 is attached and the painting robot 1 in which the IC tag reader 105 or 171 is assembled, it is possible to perform the safer and higher-efficiency work.

Figure 21:
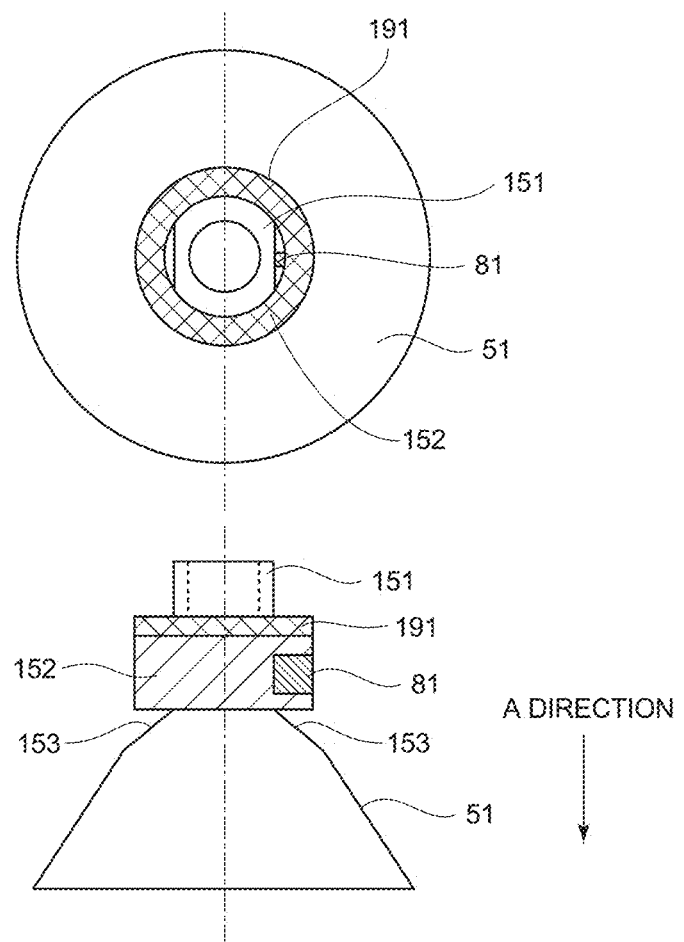
FIG. 21 is a view for explaining a protection ring 191.

Further, in order to make it possible to further prevent the resin mold 152, described using FIG. 13, in which the IC tag 81 is embedded and which is attached to the rotary atomizing head 21-3 from coming off due to the high-speed rotation, a protection ring 191 made of metal may be attached to the side opposite to the cutouts 153 (atomizing head main body 51) as illustrated in FIG. 21, for instance. The protection ring 191 corresponds to the fixing means.

The protection ring 191 made of metal may have the same inner peripheral shape as the outer shape of the attachment part 151 (shape having the combination of a circle and a rectangle) similarly to the resin mold 152, or may have a circular shape as illustrated in FIG. 21. Further, it is suitable that the radius of the protection ring 191 up to the outer periphery is substantially equal to or less than the length of the radius of the resin mold 152 up to the outer periphery as illustrated in FIG. 21. Further, the protection ring 191 may be capable of being fitted by being screwed in a direction opposite to the rotation direction, with the metal attachment part 151 having a male-threaded outer shape and the protection ring 191 having a female-threaded inner shape, or may be fitted using another method.

Figure 22:
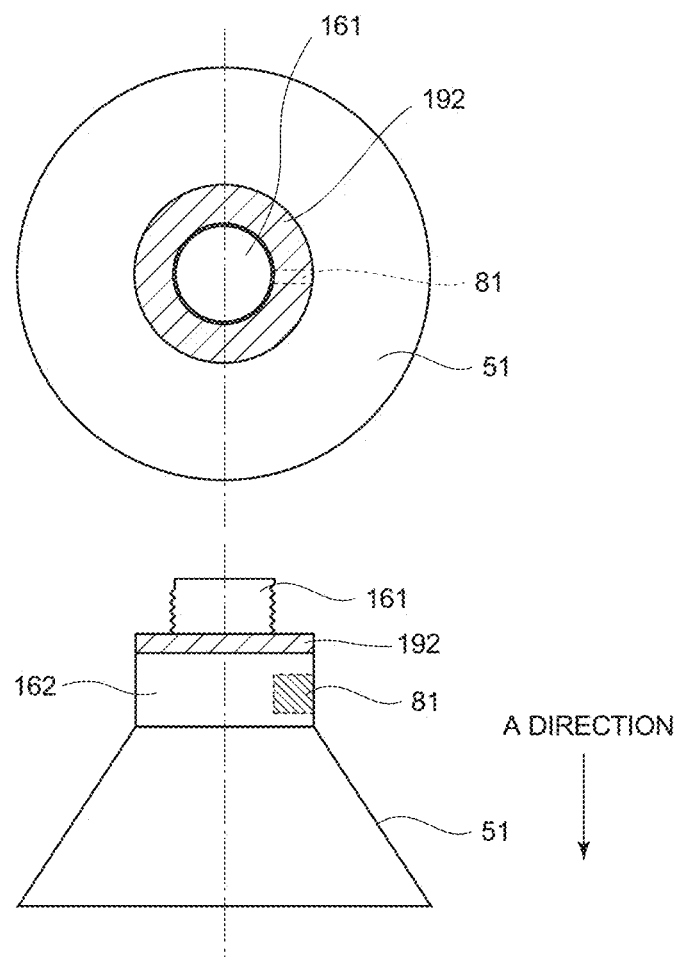
FIG. 22 is a view for explaining a protection ring 192.

Further, in order to make it possible to further prevent the resin mold 162, described using FIG. 18, in which the IC tag 81 is embedded and which is attached to the rotary atomizing head 21-4, from coming off due to the high-speed rotation, a protection ring 192 made of metal may be attached to its side opposite to the atomizing head main body 51 as illustrated in FIG. 22, for instance. The protection ring 192 corresponds to the fixing means.

Suitably, the protection ring 192 has a ring-shaped appearance similarly to the resin mold 162. Further, the radius of the protection ring 192 up to the outer periphery is desirably substantially equal to the radius of the resin mold 162 up to the outer periphery, as illustrated in FIG. 22. The protection ring 192 may be attached by having a female-threaded inner periphery similarly to the cylindrical resin mold 162 so as to be capable of being screwed to the male-threaded portion on the outer side of the attachment part 161, or may be attached using another method.

Further, in a case where the communication with the IC tag 81 using the above-described IC tag reader 105 or 171 is performed, as the diameter of the rotary atomizing head 21 is smaller as compared with ½ of the wavelength (for example, about 32 cm) of the used radio wave, the detection of the IC tag 81 by the IC tag reader 105 or 171 may become unstable or may become impossible. This becomes conspicuous in a case where the diameter of the rotary atomizing head 21 is 40 mm or less when the intensity of the detection radio wave is 30 dBm and its frequency is 920 MHz, for instance.

In the case where the detection of the IC tag 81 by the IC tag reader 105 or 171 becomes unstable due to the reduction in the diameter of the rotary atomizing head 21, the easiest solution is to shorten the distance between the IC tag reader 105 or 171 and the IC tag 81 to enhance detection accuracy, but the attachment position of the IC tag 81 to the rotary atomizing head 21 is limited as described above, and even in a case where, for example, a handy type is used as the IC tag reader 105 or 171, there is a limit approach distance that cannot be shortened due to the thickness of an antenna cover.

Therefore, by providing a relay antenna between the IC tag reader 105 or 107 and the IC tag 81, it is possible to obtain the high-frequency current i necessary for the operation of the IC tag 81. As the relay antenna, a dipole antenna formed of an insulator-coated wire having substantially the same length as a half-wavelength of the used radio wave of the IC tag communication is usable, for instance. Incidentally, this relay antenna 211 desirably has no antenna cover or the like having a non-negligible thickness.

Further, in the above description, it is described that the IC tag reader 105 or 171 which communicates with the IC tag 81 may be housed in the explosion-proof purge 41 of the robot 1 for painting or may be of the handy type. However, at a site where a conventionally used painting robot not provided with the explosion-proof purge 41 housing the IC tag reader 105 or 171 is used, there is a demand for performing the part recognition by means of the IC tag 81 and the self-check utilizing the IoT technology, using the IC tag communication as in the above-described case.

Further, in a case where a flammable volatile solution such as, for example, a thinner is used at a site where a painting robot is used, in some cases, the entrance of a worker into a space where the painting robot is installed, which space is separated by a wall or a glass window, is restricted while the painting robot is working, or the number of various control devices installed is reduced as much as possible in this space. In such a case, if the wall or the window glass separating the workplace from the outside is capable of transmitting an electromagnetic wave, the IC tag reader 105 or 171 may be installed on an outer portion of the wall or the window glass separating the workplace from the outside, without using the handy type IC tag reader 105 or 171.

However, in the case where the IC tag reader 105 or 171 is outside the workplace and is separated from the workplace by the wall or the window glass, if the diameter of the rotary atomizing head 21 is small or the wall or the window glass is thick, communication performance of the IC tag communication may deteriorate even if the wall or the window glass is capable of transmitting the electromagnetic wave.

Figure 23:
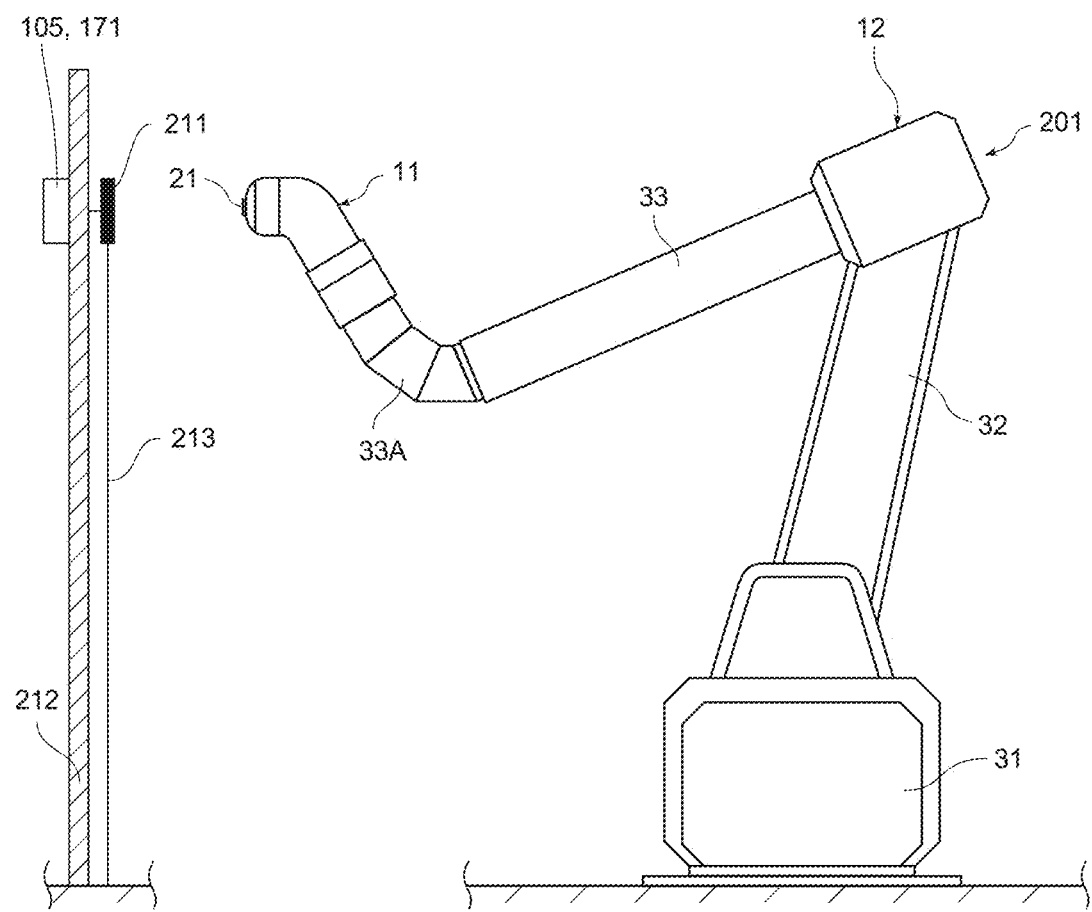
FIG. 23 is a view for explaining a case where a relay antenna 211 is provided.

Therefore, as illustrated in FIG. 23, for instance, in a case where the painting work which uses the rotary atomizing head 12 (any one of the aforesaid rotary atomizing heads 21-1 to 21-4) including the IC tag 81 is performed as in the above-described case, using a painting robot 201 not having the explosion-proof purge 41 housing the IC tag reader 105 or 171, the relay antenna 211 may be provided inside the workplace separated by the wall or the window glass when the communication is performed with the IC tag reader 105 or 171 provided outside the workplace. The painting robot 201 has the same structure as that of the painting robot 1 f except that it does not have the explosion-proof purge 41 housing the IC tag reader 105 or 171, and a detailed description thereof will be skipped.

In the illustration in FIG. 23, a workplace side of the wall or the window glass separating the workplace from the outside is used as a support 212, the relay antenna 211 is installed on the support 212, and on an immediate outer side thereof, the IC tag reader 105 or 171 is installed, but the support 212 on which the relay antenna 211 is attached may be, for example, a pillar, another structure, or the like in the workplace, other than the workplace side of the wall or the window glass.

In a case where the management process described using the flowchart in FIG. 10 is executed by making the IC tag 81 of the rotary atomizing head 21-1 of the first example or the rotary atomizing head 21-2 of the second example of the rotary atomizing head type painting device 11 described using FIG. 4 to FIG. 8 communicate with the IC tag reader 105 installed outside the wall or the window glass, using the robot 201 for painting illustrated in FIG. 23, the tip portion of the rotary atomizing head 21-1 or the rotary atomizing head 21-2 is brought close to the relay antenna 211 attached to the support 212, prior to the process at Step S1.

Figure 20:
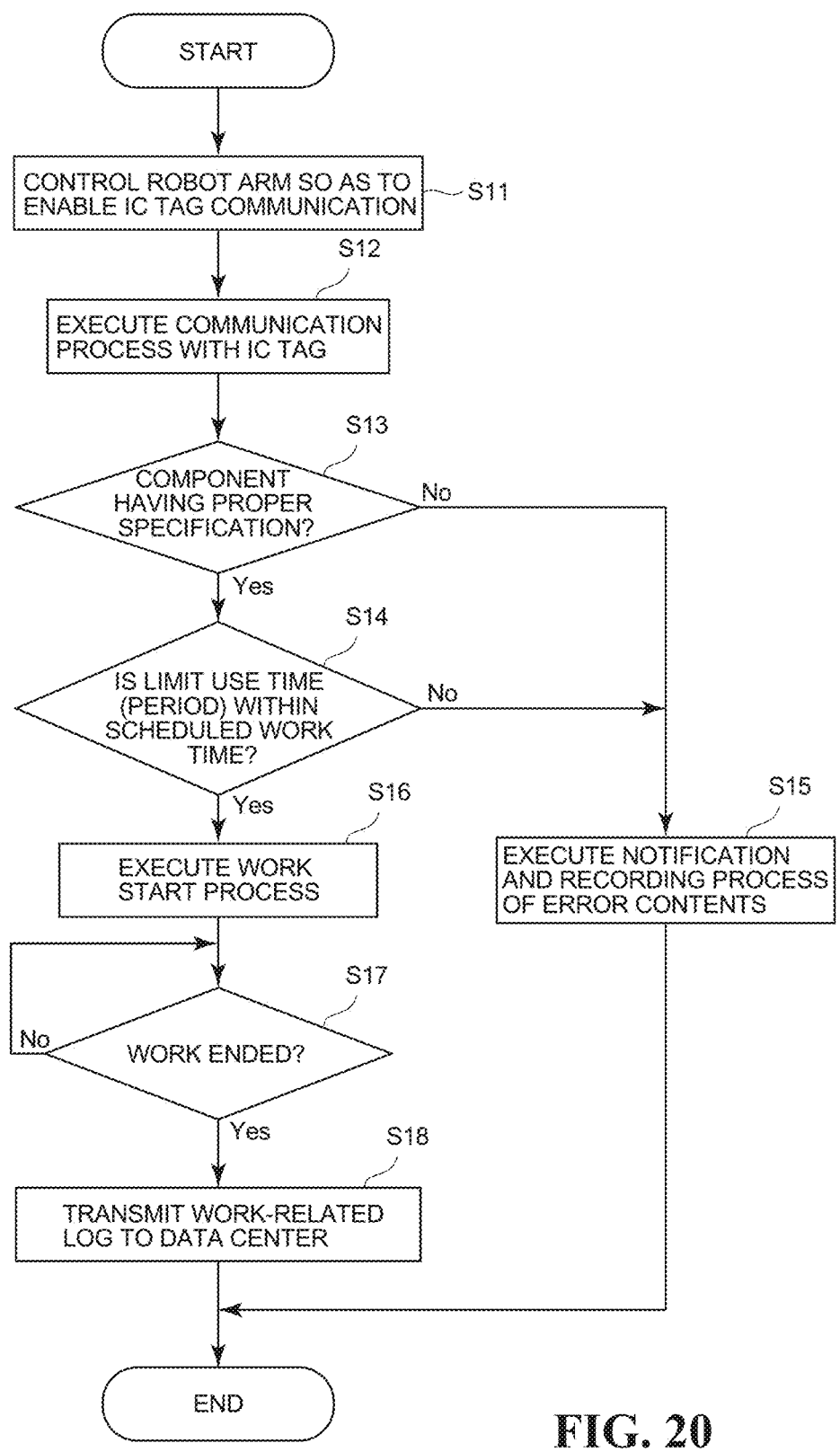
FIG. 20 is a flowchart to explain managing process of the rotary atomizing head 21-3 or 21-4.

In a case where the management process described using the flowchart in FIG. 20 is executed by making the IC tag 81 of the rotary atomizing head 21-3 of the third example or the rotary atomizing head 21-4 of the fourth example of the rotary atomizing head type painting device 11 described using FIG. 11 to FIG. 18 communicate with the IC tag reader 171 installed outside the wall or the window glass, using the painting robot 201 illustrated in FIG. 20, the tip portion of the rotary atomizing head 21-3 or the rotary atomizing head 21-4 is brought close to the relay antenna 211 attached to the support 212 by controlling the vertical arm 32 and the horizontal arm 33 of the painting robot 201 at the process at Step 11.

Figure 24:
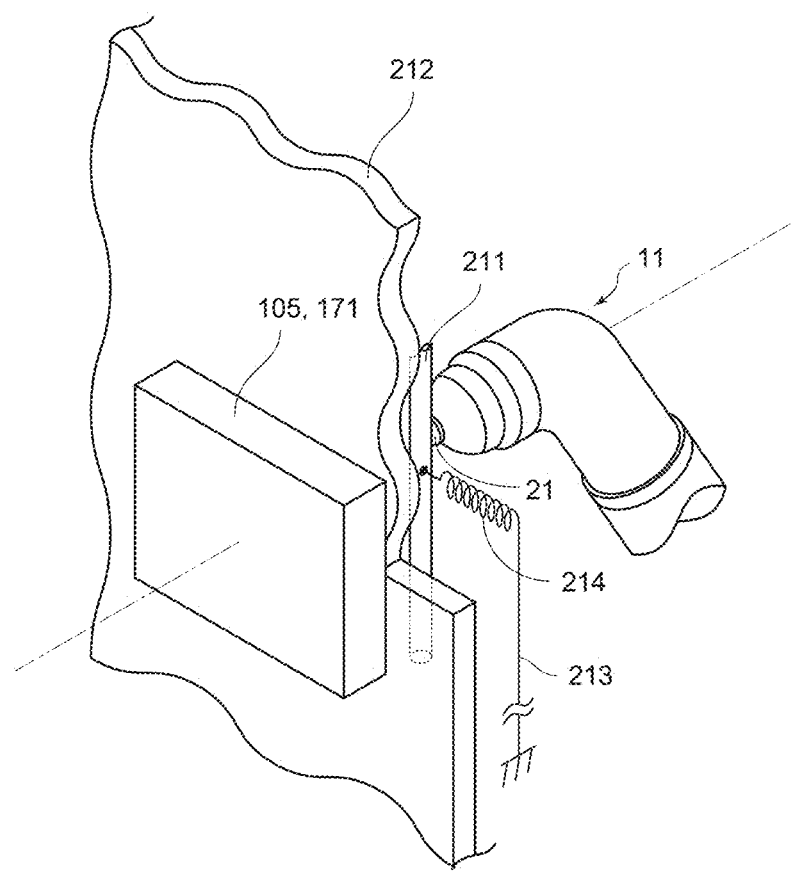
FIG. 24 is an enlarged schematic view of an installation portion of the relay antenna 211.

FIG. 24 is an enlarged schematic view of an installation portion of the relay antenna 211 described using FIG. 23. The relay antenna 211 can be constituted as a dipole antenna which promotes the resonance with the used radio wave, using an insulator-coated wire having a length (for example about 16 cm in a case where the frequency is 920 MHz) substantially equal to the half-wavelength of the used radio wave of the IC tag communication.

A ground wire 213 having a low-pass filter 214 is connected to the relay antenna 211. In the low-pass filter 214 of the ground wire 213, only static electricity and a low-frequency current flow, and a high-frequency current does not flow. The low-pass filter 214 can be constituted using any of various circuits, and when the low-pass filter 214 is constituted by, for example, a coil (inductance component), the coil has current stopping power determined by the following expression (1).

$$Z = 2\pi f L \quad (1)$$

In the expression (1), π is a circumference ratio, f is the frequency (920 MHz here, for instance) of the current, L is an inductance value of the coil, which is, for example, a value of about several mH in a case where the coil is formed by the ground wire 213 wound about ten times with a 10 mm diameter. Here, when the frequency of the high-frequency current is 920 MHz, the value of Z is very large, and therefore the high-frequency current does not flow through the ground wire 213. However, the ground wire 213 passes the static electricity and the low-frequency current to the ground to prevent the relay antenna 211 from being electrically charged. Therefore, even in a case where a flammable volatile solution or the like is used at a site where the painting robot 201 works (inside a wall, glass, or the like), it is possible to prevent ignition due to the static electricity.

Figure 25:
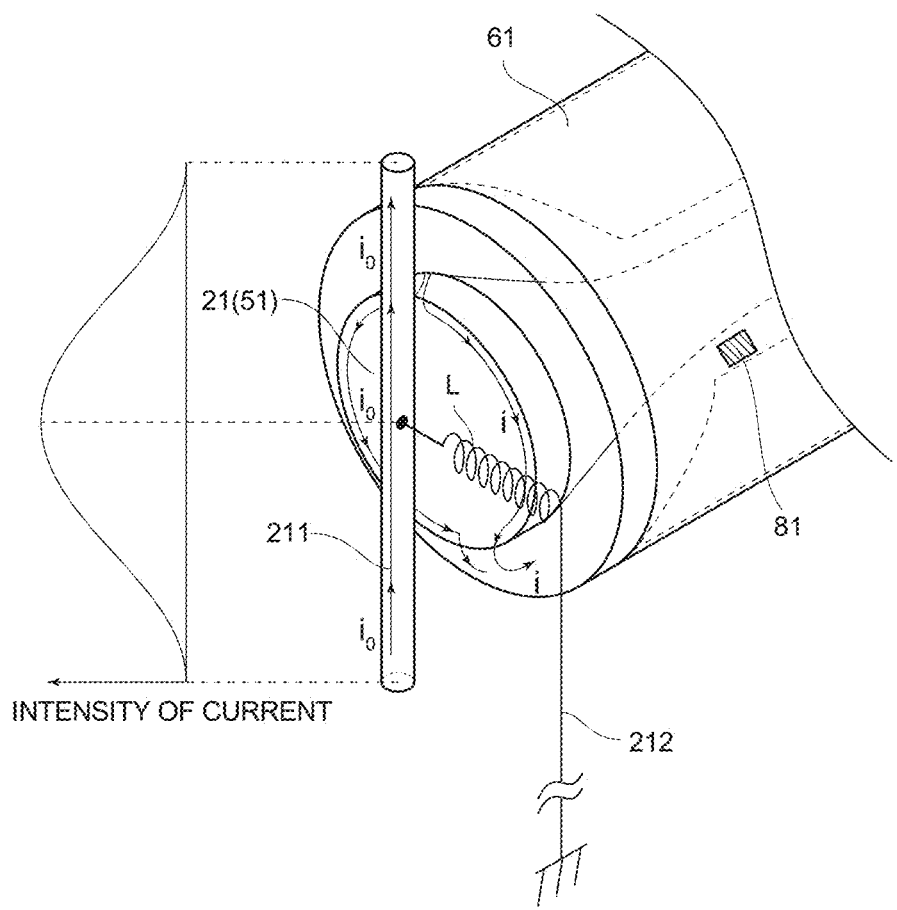
FIG. 25 is a view for explaining communication between an IC tag reader 105 or 171 and the IC tag 81 via the relay antenna 211.
Figure 26:
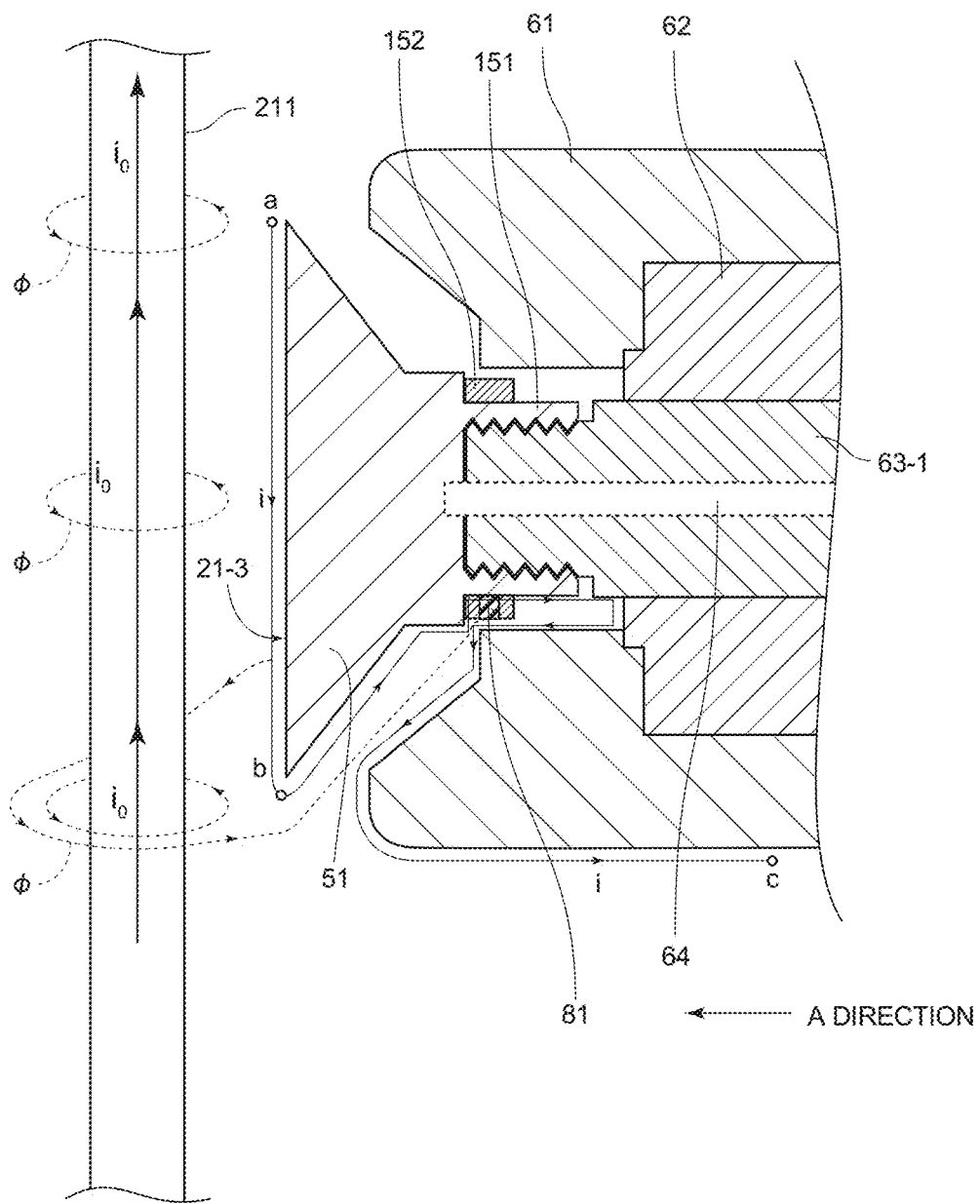
FIG. 26 is a view for explaining the communication between the IC tag reader 105 or 171 and the IC tag 81 via the relay antenna 211.

Next, the communication between the IC tag reader 105 or 171 and the IC tag 81 in the rotary atomizing head 21 via the relay antenna 211 will be described with reference to FIG. 25 and FIG. 26. In FIG. 25 and FIG. 26, the illustration of the support 212 is omitted. The relay antenna 211 is supplied with power by the radio wave output from the IC tag reader 105 or 171 (not illustrated in FIG. 25 and FIG. 26). The radio wave output from the IC tag reader 105 or 171 is diffused to a wide area because of the properties of the radio wave, but the density of the radio wave becomes high around the relay antenna 211 functioning as the dipole antenna. For example, in a case where a high-frequency current $i_0$ is generated in the relay antenna 211 in the direction indicated in FIG. 25, its current value is largest at substantially a center portion of the relay antenna 211 as is seen in the graph of the current intensity in FIG. 25 (a voltage value at this portion is 0), and the current value at end portions of the relay antenna 211 is 0. In the rotary atomizing head 21, a high-frequency current i corresponding to the high-frequency current $i_0$ is generated.

For example, in a case where the high-frequency current $i_0$ is flowing through the relay antenna 211 in the direction illustrated in FIG. 26 as in FIG. 25, a magnetic field 4 due to the high-frequency current $i_0$ is generated, and the intensity of the magnetic field ϕ is proportional to the intensity of the high-frequency current $i_0$. Therefore, on the surface of the metal portion of the rotary atomizing head 21 (in FIG. 26, the rotary atomizing head 21-3 is illustrated as an example, but the same applies to any of the rotary atomizing heads 21 described above), induced electromotive force corresponding to the intensity of the high-frequency current $i_0$ flowing through the approaching relay antenna 211 is generated, and the high-frequency current i flows.

In the case illustrated in FIG. 26, the high-frequency current i flows to the metal surfaces in the internal space sandwiched by the rotary atomizing head 21-3 and the shaping air nozzle 61. As described above, the rotary atomizing head 21-3 is supported inside the shaping air nozzle 61 via the air bearing. Therefore, in the support portion, the high-frequency current i is in a state of capacitive coupling. That is, the high-frequency current i flowing to the metal surfaces forming the internal space flows near the IC tag 81 and thereafter flows out to the outer metal surface (outer peripheral surface side) of the shaping air nozzle 61. Then, the magnetic-field-coupling of the nearby high-frequency current i flowing in parallel to the coil antenna 93 built in the IC tag 81 is caused by electromagnetic induction (mutual induction). Due to a magnetic field ϕ at this time, the high-frequency current i flows to (excites) the coil antenna 93 (refer to FIG. 3), so that the IC chip 92 operates. When the IC chip 92 operates, the tag information flows to the high-frequency current i, is conveyed to the magnetic field ϕ and the high-frequency current i flowing out to the external space along the metal surface, and is propagated by a standing wave created by the high-frequency current i, so that the radio wave containing the information stored in the IC chip 92 is radiated to the external space. This radio wave is received again by the IC tag reader 105 or 171, whereby the IC tag communication is established.

Further, as the high-frequency current $i_0$ generated in the relay antenna 211 has a larger value, the magnetic field ϕ generated by the high-frequency current $i_0$ is larger. In this case, the density of the radio wave around the relay antenna 211 is high, enabling to bring the relay antenna 211 and the rotary atomizing head 21 close to each other. Accordingly, the magnetic field ϕ generated near the center of the relay antenna 211 promotes the induction of the high-frequency current i, and also spreads to reach the IC tag 81 while keeping clear of the metal surface portion of the rotary atomizing head 21-3. Therefore, it is possible to obtain excellent communication sensitivity.

In FIG. 23 to FIG. 26, the case where the IC tag 81 provided in the rotary atomizing head 21 of the painting robot 201 and the IC tag reader 105 or 171 installed on the outer side of the wall or the window glass communicate with each other via the relay antenna 211 is described, but in a case where the painting robot 201 and the IC tag reader 105 or 171 are installed apart from each other by a distance making their direct communication difficult, though not separated by the wall or the window glass, the same effect as that in the case described using FIG. 23 to FIG. 26 can also be exhibited. At this time, it is suitable to install the relay antenna 211 at a position close to a straight line connecting the IC tag 81 provided in the rotary atomizing head 21 and the IC tag reader 105 or 177, in a state where they communicate with each other.

For example, even in the case where the painting robot 201 and the IC tag reader 171 are installed at positions whose distance makes their direct communication difficult, if the relay antenna 211 attached to the support 212 is installed at a position to which the tip portion of the rotary atomizing head 21-3 or the rotary atomizing head 21-4 can be brought close by controlling the vertical arm 32 and the horizontal arm 33 of the painting robot 201, it is possible to execute the management process described using the flowchart in FIG. 20 by making the IC tag 81 and the IC tag reader 171 communicate with each other.

It goes without saying that the above-described technique is applicable to various manufacturing fields where the management of various parts is required.

Specifically, by enabling the part recognition by means of the IC tag and the self-check using the IoT technology, using a part to which the IC tag storing the own part information is attached in a communicatable state and the IC tag reader or an industrial robot to which the IC tag reader is attached, it is possible to perform the safer and higher-efficiency work.

The above describes the case where the IC tag 81 is mounted on the rotary atomizing head 21 which is one of the components of the painting device composed of the painting robot 1 and the rotary atomizing head type painting device 11, and the unique information recorded in the IC tag 81 is read using the IC tag reader 105 or 171, but it goes without saying that, in the painting device, by attaching a recording tag other than the IC tag to the component and reading the unique information recorded in the tag using a corresponding reader, the recognition of the component, the determination on whether or not the recognized component is a usable component, the self-check utilizing the IoT technology, and so on may be performed. Further, it goes without saying that the management of various components may be enabled by attaching these recording tags on a component other than the rotary atomizing head.

The series of processes described above can be executed by hardware and can also be executed by software. In a case where the series of processes is executed by software, a program constituting the software is installed from a program recording medium to a computer incorporated in dedicated hardware or to, for example, a general-purpose personal computer capable of executing various functions by installing various programs.

Note that the program executed by the computer may be a program causing the processes to be executed chronologically in the order described in the present specification, or may be a program causing the processes to be executed in parallel or at a necessary timing such as when a call is given.

Further, an embodiment of the present invention is not limited to the above-described embodiment, and various modifications may be made therein within a range not departing from the spirit of the present invention.

The invention claimed is:

1. A rotary atomizing head used in a rotary atomizing head type painting device, the rotary atomizing head comprising:
   an atomizing head main body formed in a bell shape or a cup shape;
   an attachment part which is connected to the atomizing head main body and attaches the atomizing head main body to a motor rotary shaft of the rotary atomizing head type painting device; and
   a resin mold in which an IC tag containing unique information about the rotary atomizing head stored therein is embedded and which is attached to the attachment part,
   wherein a fit in structure fitting the renin mold to the attachment part is provided, and the IC tag is embedded in the resin mold,
   wherein the attachment part has a female screw structure and has a groove-shaped cutout portion formed at such an angle that the cutout portion does not pass through a cylindrical center of a female screw portion,
   wherein the resin mold is fitted in the cutout portion of the attachment part, and
   wherein the IC tag is embedded in the resin mold such that a surface of an embedded coil antenna is parallel to or makes a predetermined inclination angle with a cross section of the cutout portion.

2. A rotary atomizing head used in a rotary atomizing head type painting device, the rotary atomizing head comprising:
   an atomizing head main body formed in a bell-shape or a cup shape;
   an attachment part which is connected to the atomizing head main body and attaches the atomizing head main body to a motor rotary shaft of the rotary atomizing head type painting device; and
   a resin mold in which an IC tag containing unique information about the rotary atomizing head stored therein is embedded and which is attached to the attachment part,
   wherein a fit in structure fitting the resin mold to the attachment art is provided, and the IC tag is embedded in the rein mold,
   wherein the attachment part has a male screw structure and has a groove-shaped cutout portion formed at such a position that the cutout portion does not pass through a center of a male screw portion,
   wherein the min mold is fitted in the cutout portion of the attachment part, and
   wherein the IC tag is embedded in the resin mold such that a surface of an embedded coil antenna is parallel to or makes a predetermined inclination angle with a cross section of the cutout portion.

3. A rotary atomizing head used in a rotary atomizing head type painting device, the rotary atomizing head comprising:
   an atomizing head main body formed in a bell shape or a cup shape;
   an attachment part which is connected to the atomizing head main body and attaches the atomizing head main body to a motor rotary shaft of the rotary atomizing head type panting device; and
   a resin mold in which an IC tag containing unique information about the rotary atomizing head stored therein is embedded and which is attached to the attachment part,
   wherein a fit in structure fitting the resin mold to the attachment art is provided, and the IC tag is embedded in the resin mold,
   wherein the min mold is fitted to an outer periphery of the attachment part, and
   wherein the IC tag is embedded in the resin mold such that a surface of an embedded coil antenna is perpendicular to a circumferential direction along an outer periphery of the min mold.

4. The rotary atomizing head according to claim 3, further comprising
   a fixing means which fixes the resin mold to the attachment part by sandwiching the min mold between the fixing means and the atomizing head main body.

5. The rotary atomizing head according to claim 4,
   wherein the fixing means is made of metal.

6. A rotary atomizing head managing system composed of: a rotary atomizing head used in a rotary atomizing head type panting device; and a management device which manages the rotary atomizing head,
   wherein the rotary atomizing head comprises:
   an atomizing head main body formed in a bell shape or a cup shape;
   an attachment part which is connected to the atomizing head main body and attaches the atomizing head main body to a motor rotary shaft of the rotary atomizing head type painting device; and
   a resin mold in which an IC tag containing unique information about the rotary atomizing head stored therein is embedded and which is attached to the attachment part, and wherein the management device comprises:
   an IC tag communication means for executing communication with the IC tag; and
   a determination means for determining whether or not the rotary atomizing head is a usable component, based on the unique information about the rotary atomizing head stored in the IC tag which information is obtained by the IC tag communication means,
   wherein, in the rotary atomizing head,
   the resin mold is fitted to an outer periphery of the attachment part, and the IC tag is embedded in the resin mold such that a surface of an embedded coil antenna is perpendicular to a circumferential direction along an outer periphery of the resin mold, wherein the management device further comprises an information exchange means for exchanging information with an external information process device via a network, and wherein, in a case where the rotary atomizing head is the usable component, the information exchange means transmits, to the external information processing device, information about a work executed using the rotary atomizing head.

\* \* \* \* \*